US012749768B2

(12) United States Patent
Clement et al.

(10) Patent No.: US 12,749,768 B2
(45) Date of Patent: Sep. 29, 2026

(54) FINE GLASS FIBERS AND FIBER WEBS, SEPARATORS, AND PASTING PAPERS COMPRISING THEM

(71) Applicant: Hollingsworth & Vose Company, East Walpole, MA (US)

(72) Inventors: Nicolas Clement, Littleton, MA (US); Amogh N. Karwa, Lexington, MA (US); John A. Wertz, Hollis, NH (US); John J. Herrington, III, Corvallis, OR (US); Asif Masih Sharazi, Bonaire, GA (US)

(73) Assignee: Hollingsworth & Vose Company, East Walpole, MA (US)

( * ) Notice: Subject to any disclaimer, the term of this patent is extended or adjusted under 35 U.S.C. 154(b) by 532 days.

(21) Appl. No.: 18/327,762

(22) Filed: Jun. 1, 2023

(65) Prior Publication Data

US 2024/0405366 A1 Dec. 5, 2024

(51) Int. Cl.

| | |
|---|---|
| ***H01M 50/44*** | (2021.01) |
| ***H01M 50/437*** | (2021.01) |
| ***H01M 50/494*** | (2021.01) |

(52) U.S. Cl.
CPC ......... *H01M 50/44* (2021.01); *H01M 50/437* (2021.01); *H01M 50/494* (2021.01)

(58) Field of Classification Search
CPC ............................ H01M 50/437; H01M 50/44
See application file for complete search history.

(56) References Cited

U.S. PATENT DOCUMENTS

| | | | |
|---|---|---|---|
| 4,205,122 | A | 5/1980 | Miura et al. |
| 4,216,281 | A | 8/1980 | O'Rell et al. |
| 5,009,971 | A | 4/1991 | Johnson et al. |
| 5,035,966 | A | 7/1991 | Tokunaga et al. |
| 5,091,275 | A | 2/1992 | Brecht et al. |
| 5,128,218 | A | 7/1992 | Tokunaga et al. |
| 5,180,647 | A | 1/1993 | Rowland et al. |
| 5,206,100 | A | 4/1993 | Muto et al. |
| 5,221,587 | A | 6/1993 | Bohnstedt et al. |

(Continued)

FOREIGN PATENT DOCUMENTS

| | | | |
|---|---|---|---|
| CN | 102623659 | A | 8/2012 |
| CN | 105024031 | A | 11/2015 |

(Continued)

OTHER PUBLICATIONS

[No Author Listed], Glatfelter, Pasting papers for highest efficiency. Product Document. www.glatfelter.com, TS-PASTING-EN-0308, web archive document. May 15, 2012. <http://www.glatfelter.com/Files/products/technical/ts_battery_paper.pdf>. 3 pages.

(Continued)

*Primary Examiner* — Amanda C. Walke
(74) *Attorney, Agent, or Firm* — Wolf, Greenfield & Sacks, P.C.

(57) ABSTRACT

Fine glass fibers, as well as fiber webs, separators, and pasting papers comprising the fine glass fibers, are generally described. In some embodiments, the fine glass fibers have a relatively high BET specific surface area (e.g., greater than or equal to 1.6 $m^2/g$) while maintaining a relatively low aspect ratio (e.g., less than or equal to 80).

35 Claims, 8 Drawing Sheets

(56) References Cited

U.S. PATENT DOCUMENTS 5,225,298 A 7/1993 Nakayama et al.
5,389,471 A 2/1995 Kung
5,436,094 A 7/1995 Horimoto et al.
5,541,013 A 7/1996 Shiomi et al.
5,580,459 A 12/1996 Powers et al.
5,618,642 A 4/1997 Samii et al.
5,672,399 A 9/1997 Kahlbaugh et al.
5,679,479 A 10/1997 Young et al.
5,785,725 A 7/1998 Cusick et al.
5,894,055 A 4/1999 Young et al.
5,985,484 A 11/1999 Young et al.
5,989,750 A 11/1999 Ohba et al.
6,132,899 A 10/2000 Young et al.
6,143,441 A 11/2000 Zguris et al.
6,171,684 B1 1/2001 Kahlbaugh et al.
6,200,706 B1 3/2001 Ashida et al.
6,225,005 B1 5/2001 Shiomi et al.
6,306,539 B1 10/2001 Zguris
6,495,286 B2 12/2002 Zguris et al.
6,495,288 B2 12/2002 Shiomi et al.
6,506,522 B2 1/2003 Clough
6,528,205 B1 3/2003 Kishimoto et al.
6,689,509 B2 2/2004 Zucker
6,706,450 B2 3/2004 Asada
6,939,645 B2 9/2005 Sugiyama et al.
7,008,465 B2 3/2006 Graham et al.
7,097,939 B2 8/2006 Ferreira et al.
7,137,510 B1 11/2006 Klein et al.
7,288,338 B2 10/2007 Zguris
7,314,497 B2 1/2008 Kahlbaugh et al.
7,742,279 B2 6/2010 Takahashi et al.
7,923,151 B2 4/2011 Lam et al.
7,981,818 B2 7/2011 Justice
8,071,239 B2 12/2011 Sugie et al.
8,197,967 B2 6/2012 Sugie et al.
8,404,378 B2 3/2013 Whear et al.
8,608,817 B2 12/2013 Wertz et al.
8,846,252 B2 9/2014 Wetzel et al.
9,117,596 B2 8/2015 Loganathan et al.
9,118,063 B2 8/2015 Guo et al.
9,118,065 B2 8/2015 Obernyer et al.
9,203,116 B2 12/2015 Lam et al.
9,293,748 B1 3/2016 Ashirgade et al.
9,401,508 B2 7/2016 Lam et al.
9,450,232 B2 9/2016 Furukawa et al.
9,508,493 B2 11/2016 Jun et al.
9,524,831 B2 12/2016 Furukawa et al.
9,577,236 B2 2/2017 Ashirgade et al.
9,627,668 B1 4/2017 Ashirgade et al.
9,666,860 B2 5/2017 Lam et al.
9,728,756 B2 8/2017 Ashirgade et al.
9,755,205 B2 9/2017 Guo et al.
9,786,885 B2 10/2017 Jiang
9,812,703 B2 11/2017 Furukawa et al.
9,960,454 B2 5/2018 Guo et al.
10,014,501 B2 7/2018 Natesh et al.
10,135,051 B2 11/2018 Wertz et al.
10,177,360 B2 1/2019 Keisler et al.
10,230,086 B2 3/2019 Ino et al.
10,270,074 B2 4/2019 Natesh et al.
10,411,239 B2 9/2019 Natesh et al.
10,431,796 B2 10/2019 Ashirgade et al.
10,535,853 B2 1/2020 Wertz et al.
10,644,289 B2 5/2020 Jiang
11,152,666 B2 * 10/2021 Zettl ................. H01M 10/0525
11,239,531 B2 2/2022 Keisler et al.
11,245,117 B2 2/2022 Dudenbostel et al.
11,411,280 B2 8/2022 Johns et al.
2001/0009734 A1 7/2001 Clough
2002/0142226 A1 * 10/2002 Zguris ................. H01M 50/489
429/251
2003/0054236 A1 3/2003 Zucker
2003/0180622 A1 9/2003 Tsukuda et al.
2003/0186126 A1 10/2003 Weerts et al.
2006/0141350 A1 6/2006 Dreyer et al.
2008/0199737 A1 8/2008 Kazaryan et al.
2008/0299462 A1 12/2008 Whear et al.
2009/0148760 A1 6/2009 Justice
2011/0091761 A1 4/2011 Miller et al.
2011/0123866 A1 5/2011 Pan et al.
2011/0147320 A1 6/2011 Sealey et al.
2011/0151286 A1 6/2011 Lam et al.
2011/0177375 A1 7/2011 Pfanner et al.
2011/0177392 A1 7/2011 Hoshiba
2011/0293988 A1 12/2011 Obernyer et al.
2012/0070713 A1 3/2012 Whear et al.
2012/0070714 A1 3/2012 Chambers et al.
2012/0070727 A1 3/2012 Wertz et al.
2012/0070728 A1 3/2012 Wertz et al.
2012/0070729 A1 3/2012 Wertz et al.
2012/0070747 A1 3/2012 Whear et al.
2012/0094174 A1 4/2012 Furukawa et al.
2012/0145468 A1 6/2012 Pekala et al.
2012/0258336 A1 10/2012 Jun et al.
2012/0270110 A1 10/2012 Waterhouse et al.
2013/0017432 A1 1/2013 Roumi
2013/0029229 A1 1/2013 Mack et al.
2013/0071723 A1 3/2013 Wertz et al.
2013/0071734 A1 3/2013 Wertz et al.
2013/0071735 A1 3/2013 Wertz et al.
2013/0157130 A1 6/2013 Tamaki et al.
2013/0224632 A1 8/2013 Roumi
2013/0273409 A1 10/2013 Nandi et al.
2013/0344373 A1 12/2013 Miller et al.
2014/0057154 A1 2/2014 Timmons
2014/0134498 A1 5/2014 Lim et al.
2014/0186660 A1 7/2014 Friedl-Goeppentin et al.
2014/0186712 A1 7/2014 Albano et al.
2014/0227585 A1 8/2014 Wertz et al.
2014/0234685 A1 8/2014 Nitta et al.
2014/0255752 A1 9/2014 Miller et al.
2014/0255789 A1 9/2014 Miller et al.
2014/0272535 A1 9/2014 Clement et al.
2014/0349169 A1 11/2014 Mizuno et al.
2014/0377628 A1 12/2014 Nandi et al.
2015/0050540 A1 2/2015 Toduka et al.
2015/0086838 A1 3/2015 Guo et al.
2015/0099153 A1 4/2015 Guo et al.
2015/0099155 A1 4/2015 Guo et al.
2015/0099157 A1 4/2015 Ketzer et al.
2015/0099189 A1 4/2015 Ketzer et al.
2016/0079581 A1 3/2016 Ashirgade et al.
2016/0149183 A1 * 5/2016 Keisler ................. H01M 50/44
429/247
2016/0164058 A1 6/2016 Ashirgade et al.
2016/0268567 A1 * 9/2016 Guo ................... H01M 50/403
2016/0301053 A1 10/2016 Jiang
2016/0380250 A1 * 12/2016 Umeyama ........... H01M 50/454
429/145
2017/0092917 A1 3/2017 Ashirgade et al.
2017/0133650 A1 5/2017 Krishnamoorthy et al.
2017/0170442 A1 6/2017 Ashirgade et al.
2017/0179454 A1 6/2017 Natesh et al.
2017/0294639 A1 10/2017 Natesh
2017/0373293 A1 12/2017 Jiang
2018/0026247 A1 1/2018 Ashirgade et al.
2018/0047964 A1 2/2018 Natesh et al.
2018/0145298 A1 5/2018 Vulfson et al.
2018/0175392 A1 * 6/2018 Wertz ................. H01M 50/446
2018/0269450 A1 9/2018 Hayakawa et al.
2018/0269452 A1 9/2018 Natesh et al.
2019/0115579 A1 4/2019 Wertz et al.
2019/0157646 A1 5/2019 Keisler et al.
2019/0181410 A1 6/2019 Kumar et al.
2019/0181506 A1 6/2019 Clement et al.
2019/0280273 A1 9/2019 Natesh et al.
2019/0393464 A1 12/2019 Rocha et al.
2020/0328390 A1 10/2020 Kumar et al.
2021/0242449 A1 * 8/2021 Deiters ................. H01M 10/06
2021/0249640 A1 8/2021 Jiang
2022/0166107 A1 5/2022 Keisler et al.

(56) References Cited

U.S. PATENT DOCUMENTS

| | | | | |
|---|---|---|---|---|
| 2022/0247037 | A1 * | 8/2022 | Wertz .................... | H01M 10/06 |
| 2022/0336925 | A1 | 10/2022 | Jiang | |

FOREIGN PATENT DOCUMENTS

| | | | |
|---|---|---|---|
| CN | 204905333 | U | 12/2015 |
| CN | 204905334 | U | 12/2015 |
| CN | 105428570 | A | 3/2016 |
| CN | 107836050 | A | 3/2018 |
| CN | 109473613 | A | 3/2019 |
| EP | 0 349 868 | A1 | 1/1990 |
| EP | 0 466 302 | A1 | 1/1992 |
| EP | 0 680 105 | A1 | 11/1995 |
| EP | 1 585 182 | A1 | 10/2005 |
| EP | 1 617 495 | A1 | 1/2006 |
| EP | 2 858 143 | A1 | 4/2015 |
| EP | 2 919 957 | B1 | 4/2018 |
| EP | 2 619 365 | B1 | 12/2018 |
| GB | 679 514 | A | 9/1952 |
| GB | 1 107 783 | A | 3/1968 |
| GB | 1 169 652 | A | 11/1969 |
| GB | 1 291 987 | A | 10/1972 |
| JP | 2004-253188 | A | 9/2004 |
| JP | 2006-236991 | A | 9/2006 |
| JP | 2011-233390 | A | 11/2011 |
| KR | 100645970 | B1 | 11/2006 |
| WO | WO 01/13442 | A1 | 2/2001 |
| WO | WO 2011/146271 | A1 | 11/2011 |
| WO | WO 2012/040395 | A2 | 3/2012 |
| WO | WO 2013/154623 | A1 | 10/2013 |
| WO | WO 2014/149703 | A1 | 9/2014 |
| WO | WO 2016/134222 | A1 | 8/2016 |
| WO | WO 2016/179362 | A1 | 11/2016 |
| WO | WO 2016/210225 | A1 | 12/2016 |
| WO | WO 2017/047638 | A1 | 3/2017 |
| WO | WO 2019/051159 | A1 | 3/2019 |

OTHER PUBLICATIONS

Hu et al., The new development of valve regulated lead/acid battery. Chinese Labat Man. 2001;3:33-41. Abstract only.

Turbak, Nonwovens: Theory, Process, Performance, and Testing. Tappi Press 1993. Excerpt pp. 144-147.

Zguris et al., Nonwovens Battery Separators to improve performance in lead acid battery systems. Mabat Conference. Warsaw, Poland. Jul. 24, 1991. 17 pages.

International Search Report and Written Opinion for PCT/US15/21761 mailed Jun. 29, 2015.

International Search Report and Written Opinion for PCT/US2018/065065 mailed Feb. 27, 2019.

Invitation to Pay Additional Fees for PCT/US19/36699 mailed Oct. 8, 2019.

International Search Report and Written Opinion for PCT/US19/36699 mailed Dec. 6, 2019.

International Search Report and Written Opinion for International Application No. PCT/US2024/031631 dated Sep. 18, 2024.

[No Author Listed], Micrex/Microcreper. Micrex Corporation. Walpole, MA. In existence as of Jan. 2015. Last accessed Jun. 6, 2017 at <http://micrex.com/micrexmicrocreper>. 4 pages.

* cited by examiner

FINE GLASS FIBERS AND FIBER WEBS, SEPARATORS, AND PASTING PAPERS COMPRISING THEM

FIELD

The present invention relates generally to fine glass fibers, and fibers webs, separators, and pasting papers comprising them.

BACKGROUND

Fibers with smaller diameters (e.g., fine fibers) are typically used in applications where a higher BET specific surface area is desirable, but the aspect ratios of such fibers are typically relatively high, as aspect ratio typically increases as the fiber diameter decreases (e.g., due to manufacturing constraints). However, in some cases, fine fibers that maintain a relatively low aspect ratio at a relatively high BET specific surface area may be beneficial.

SUMMARY

Fine glass fibers, and fiber webs, separators, and pasting papers comprising them are generally described.

Some aspects are related to battery separators. In some embodiments, the battery separator comprises a fiber web comprising fine glass fibers; wherein the fine glass fibers have an average diameter of less than 1.6 microns, an average aspect ratio of less than or equal to 80, and an average BET specific surface area of greater than or equal to 1.6 $m^2/g$; and wherein the fiber web has a basis weight of greater than or equal to 20 $g/m^2$ and less than or equal to 600 $g/m^2$.

In some embodiments, the battery separator comprises a fiber web comprising fine glass fibers and strengthening fibers; wherein the fine glass fibers have an average diameter of less than 1.6 microns, an average aspect ratio of less than or equal to 80, and an average BET specific surface area of greater than or equal to 1.6 $m^2/g$; and wherein the fiber web has a basis weight of greater than or equal to 20 $g/m^2$ and less than or equal to 600 $g/m^2$.

In some embodiments, the battery separator comprises a fiber web comprising fine glass fibers and coarse glass fibers; wherein the fine glass fibers have an average diameter of less than 1.6 microns, an average aspect ratio of less than or equal to 80, and an average BET specific surface area of greater than or equal to 1.6 $m^2/g$; wherein the coarse glass fibers have an average diameter of greater than or equal to 1.6 microns; and wherein the fiber web has a basis weight of greater than or equal to 20 $g/m^2$ and less than or equal to 600 $g/m^2$.

Some aspects are related to pasting paper for use in a battery. In some embodiments, the pasting paper for use in a battery comprises a fiber web comprising fine glass fibers; wherein the fine glass fibers have an average diameter of less than 1.6 microns, an average aspect ratio of less than or equal to 80 and an average BET specific surface area of greater than or equal to 1.6 $m^2/g$; and wherein the pasting paper has a thickness of greater than or equal to 0.1 mm and less than or equal to 0.5 mm.

In some embodiments, the pasting paper for use in a battery comprises a fiber web comprising fine glass fibers and strengthening fibers; wherein the fine glass fibers have an average diameter of less than 1.6 microns, an average aspect ratio of less than or equal to 80 and an average BET specific surface area of greater than or equal to 1.6 $m^2/g$; and wherein the pasting paper has a thickness of greater than or equal to 0.1 mm and less than or equal to 0.5 mm.

In some embodiments, the pasting paper for use in a battery comprises a fiber web comprising fine glass fibers and coarse glass fibers; wherein the fine glass fibers have an average diameter of less than 1.6 microns, an average aspect ratio of less than or equal to 80 and an average BET specific surface area of greater than or equal to 1.6 $m^2/g$; wherein the coarse glass fibers have an average diameter of greater than or equal to 1.6 microns; and wherein the pasting paper has a thickness of greater than or equal to 0.1 mm and less than or equal to 0.5 mm. Some aspects are related to a plurality of glass fibers. In some embodiments, the plurality of glass fibers comprises fine glass fibers having an average diameter of less than 1.6 microns, an average aspect ratio of less than or equal to 80, and an average BET specific surface area of greater than or equal to 1.6 $m^2/g$.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
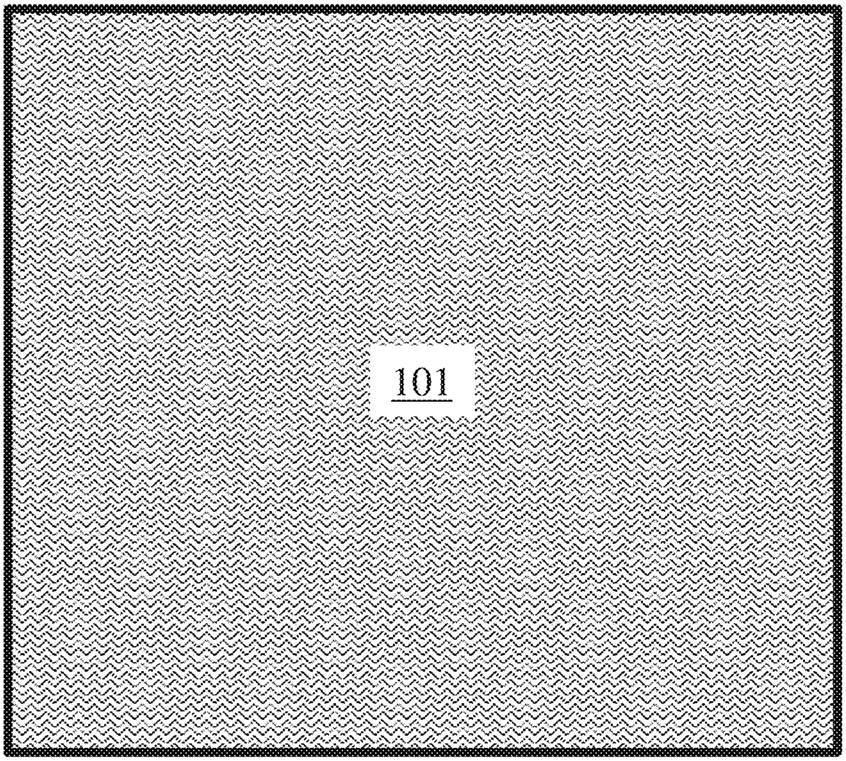
FIG. 1 shows a top-view schematic of a fiber web, in accordance with some embodiments.

Fine glass fibers and their applications are generally described. Fibers with smaller diameters (e.g., fine fibers)

are typically used in applications where a higher BET specific surface area is desirable, but the aspect ratio of such fibers is often relatively high, as aspect ratio typically increases as the fiber diameter decreases (e.g., due to manufacturing constraints). In some embodiments, the fine glass fibers disclosed herein have a relatively high BET specific surface area (e.g., greater than or equal to 1.6 $m^2/g$) while maintaining a relatively low aspect ratio (e.g., less than or equal to 80). In some instances, such fine glass fibers may provide numerous advantages, such as they may be produced at higher fiber manufacturing factor (FMF), at lower cost, and/or with lower carbon dioxide emissions and/or they may create fewer flocks when wetlaid than fine glass fibers having a higher aspect ratio, all other factors being equal.

Fiber webs, separators, and pasting papers comprising the fine glass fibers are also generally described. In some embodiments, use of the fine glass fibers disclosed herein results in a fiber web, separator, and/or pasting paper with lower tensile strength than a fiber web, separator, and/or pasting paper using fine glass fibers having a higher aspect ratio, all other factors being equal. However, it was unexpectedly discovered that, in some instances, combinations of fine glass fibers disclosed herein with other types of fibers (e.g., strengthening fibers) in the fiber web, separator, and/or pasting paper provides substantially similar or improved tensile strength while providing other advantages (e.g., higher FMF, lower cost, lower carbon dioxide emissions, fewer flocks, increased elongation at break, relatively low electrical resistance, increased surface area, smaller maximum pore size, and/or smaller mean pore size) compared to a fiber web, separator, and/or pasting paper with fine glass fibers having a higher aspect ratio, all other factors being equal.

Some embodiments relate to a plurality of glass fibers. In some embodiments, the plurality of glass fibers comprises fine glass fibers. According to some embodiments, the fine glass fibers comprise microglass fibers. Microglass fibers may comprise fibers produced by drawing a melt of glass from brushing tips into continuous fibers and then subjecting the continuous fibers to a flame blowing process and/or a rotary spinning process. It is also possible for microglass fibers to comprise fibers formed by a remelting process.

The fine glass fibers (e.g., fine microglass fibers) may have a variety of suitable glass chemistries. As non-limiting examples, in some embodiments, the fine glass fibers (e.g., fine microglass fibers) comprise M-glass, B-glass, C-glass, Advantex glass, 481 glass, and/or 10-20 wt % alkali metal oxides (e.g., sodium oxides and/or magnesium oxides).

The fine glass fibers (e.g., fine microglass fibers) may have a variety of suitable average diameters. In some embodiments, the fine glass fibers (e.g., fine microglass fibers) have an average diameter of greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 1.1 microns, greater than or equal to 1.2 microns, greater than or equal to 1.3 microns, greater than or equal to 1.4 microns, or greater than or equal to 1.5 microns. In some embodiments, the fine glass fibers (e.g., fine microglass fibers) have an average diameter of less than 1.6 microns, less than or equal to 1.5 microns, less than or equal to 1.4 microns, less than or equal to 1.3 microns, less than or equal to 1.2 microns, less than or equal to 1.1 microns, less than or equal to 1 micron, less than or equal to 0.9 microns, less than or equal to 0.8 microns, less than or equal to 0.7 microns, less than or equal to 0.6 microns, less than or equal to 0.5 microns, or less than or equal to 0.4 microns. Combinations of the above-referenced ranges are also possible (e.g., greater than or equal to 0.3 microns and less than 1.6 microns, greater than or equal to 0.5 microns and less than 1.6 microns, or greater than or equal to 1.4 microns and less than 1.6 microns). Other ranges are also possible. The average diameter (D) of the fine glass fibers (e.g., fine microglass fibers) may be calculated using the BET specific surface area (measured as disclosed elsewhere herein) according to the following equation: D=4/Sd, wherein S is the BET specific surface area of 1 gram of fiber in $m^2/g$ and d is the density of the fiber in $g/cm^3$.

The fine glass fibers (e.g., fine microglass fibers) may have relatively small lengths. In some embodiments, the fine glass fibers (e.g., fine microglass fibers) have an average length of less than or equal to 0.3 mm, less than or equal to 0.28 mm, less than or equal to 0.25 mm, less than or equal to 0.23 mm, less than or equal to 0.2 mm, less than or equal to 0.18 mm, less than or equal to 0.16 mm, less than or equal to 0.14 mm, less than or equal to 0.12 mm, less than or equal to 0.1 mm, less than or equal to 0.08 mm, or less than or equal to 0.05 mm. In some embodiments, the fine glass fibers (e.g., fine microglass fibers) have an average length of greater than or equal to 0.01 mm, greater than or equal to 0.02 mm, greater than or equal to 0.03 mm, greater than or equal to 0.04 mm, greater than or equal to 0.05 mm, greater than or equal to 0.06 mm, greater than or equal to 0.07 mm, greater than or equal to 0.08 mm, greater than or equal to 0.09 mm, greater than or equal to 0.1 mm, greater than or equal to 0.11 mm, greater than or equal to 0.12 mm, greater than or equal to 0.13 mm, greater than or equal to 0.14 mm, greater than or equal to 0.15 mm, greater than or equal to 0.175 mm, greater than or equal to 0.2 mm, or greater than or equal to 0.25 mm. Combinations of the above-referenced ranges are also possible (e.g., greater than or equal to 0.01 mm and less than or equal to 0.3 mm, greater than or equal to 0.04 mm and less than or equal to 0.12 mm, or greater than or equal to 0.09 mm and less than or equal to 0.12 mm). Other ranges are also possible. The average length of the fine glass fibers (e.g., fine microglass fibers) may be measured using a Diamscope and measuring at least 10,000 fibers.

For any measurements disclosed herein using a Diamscope (e.g., average length of the fine glass fibers, average length of the coarse glass fibers, average aspect ratio of the fine glass fibers, and average aspect ratio of the coarse glass fibers), the settings are changed from the factory default settings within the Diamscope's software as follows: "Histogram bin size" is changed from 0.20 to 0.10; "Maximum width (μm)" is changed from 30.00 to 65.00; "Minimum fibre length (mm)" is changed from 0.05 to 0.02; "Maximum density of sample" is changed from 5.00 to 3.00; and "Fibre Limit" is changed from 2,000 to 10,000. Further, the Diamscope testing is performed on virgin glass fiber samples and uses the 0.8 mm×75 mm die cutter provided with the Diamscope, a 50 ml vial with a screw on cap and 27 mm diameter opening, de-ionized water, and a manual pipette with a 4 mm opening, 6 mm×80 mm stem and an 11 mm×35 mm bulb. To prepare the sample, a single layer of fiber is peeled away from the initial sample, with a thickness no greater than 3 mm, and a width and length great enough to lay flat and cover the entire die slot on the cutter. The sample cup supplied with the slicer is placed below the die cutter and the sample is cut with the die cutter. A thin strip of fiber is collected in the sample cup below the die-cutter. This step is repeated until 4 thin strips of fiber are collected in the sample cup. The 4 thin strips of fiber are transferred into a 50 ml vial. The vial is filled with 35 ml of de-ionized water and capped. Then the vial is vigorously shaken vertically for 1 minute to disperse the fibers. The cap is removed from the vial, and a liquid sample is slowly drawn from the vial using the pipette described above, starting the draw 5 mm from the bottom and ending 5 mm from the surface of the sample. The sample is ejected into the Diamscope's sample bowl. Within the Diamscope software, the "start scan" button is clicked, such that the sample is pre-mixed in the sample bowl for 30 seconds, after which time the fiber analysis will automatically begin. Once the fiber analysis has completed, the Diamscope will automatically report out the pertinent data. Within the data report, the mean average glass fiber diameter (μm) for the sample analyzed is listed and the mean average glass fiber length (mm) is listed.

The fine glass fibers (e.g., fine microglass fibers) may have a relatively low aspect ratio. In some embodiments, the fine glass fibers (e.g., fine microglass fibers) have an average aspect ratio of less than or equal to 80, less than or equal to 79, less than or equal to 78, less than or equal to 77, less than or equal to 76, less than or equal to 75, less than or equal to 70, less than or equal to 65, less than or equal to 60, less than or equal to 55, less than or equal to 50, less than or equal to 45, or less than or equal to 40. In some embodiments, the fine glass fibers (e.g., fine microglass fibers) have an average aspect ratio of greater than or equal to 10, greater than or equal to 15, greater than or equal to 20, greater than or equal to 25, greater than or equal to 30, greater than or equal to 35, greater than or equal to 40, greater than or equal to 45, greater than or equal to 50, greater than or equal to 55, greater than or equal to 60, greater than or equal to 65, or greater than or equal to 70. Combinations of the above-referenced ranges are also possible (e.g., greater than or equal to 10 and less than or equal to 80, greater than or equal to 30 and less than or equal to 80, or greater than or equal to 55 and less than or equal to 75). Other ranges are also possible. The average aspect ratio of the fine glass fibers (e.g., fine microglass fibers) may be measured by dividing the average length by the average diameter (using the same unit for both length and diameter) for at least 10,000 fibers, wherein both the length and diameter are measured using a Diamscope. Without wishing to be bound by theory, it is believed that, in some instances, fine glass fibers with relatively low aspect ratios (e.g., aspect ratios disclosed herein for fine glass fibers) may provide numerous advantages, such as they may be produced at higher fiber manufacturing factor (FMF), at lower cost, and/or with lower carbon dioxide emissions and/or they may create fewer flocks when wetlaid than fine glass fibers having a higher aspect ratio, all other factors being equal.

The fine glass fibers (e.g., fine microglass fibers) may have a relatively high BET specific surface area. In some embodiments, the fine glass fibers (e.g., fine microglass fibers) have an average BET specific surface area of greater than or equal to 1.6 $m^2/g$, greater than or equal to 1.7 $m^2/g$, greater than or equal to 1.8 $m^2/g$, greater than or equal to 1.9 $m^2/g$, greater than or equal to 2.0 $m^2/g$, greater than or equal to 2.2 $m^2/g$, greater than or equal to 2.4 $m^2/g$, greater than or equal to 2.6 $m^2/g$. greater than or equal to 2.8 $m^2/g$, greater than or equal to 3.0 $m^2/g$, greater than or equal to 3.2 $m^2/g$, greater than or equal to 3.4 $m^2/g$, greater than or equal to 3.6 $m^2/g$, greater than or equal to 3.8 $m^2/g$, or greater than or equal to 4.0 $m^2/g$. In some embodiments, the fine glass fibers (e.g., fine microglass fibers) have an average BET specific surface area of less than or equal to 5.0 $m^2/g$, less than or equal to 4.9 $m^2/g$, less than or equal to 4.8 $m^2/g$, less than or equal to 4.7 $m^2/g$, less than or equal to 4.6 $m^2/g$, less than or equal to 4.5 $m^2/g$, less than or equal to 4.4 $m^2/g$, less than or equal to 4.2 $m^2/g$, less than or equal to 4.0 $m^2/g$. less than or equal to 3.8 $m^2/g$, less than or equal to 3.6 $m^2/g$, less than or equal to 3.4 $m^2/g$, less than or equal to 3.2 $m^2/g$, less than or equal to 3.0 $m^2/g$, less than or equal to 2.8 $m^2/g$, less than or equal to 2.6 $m^2/g$, less than or equal to 2.5 $m^2/g$, less than or equal to 2.3 $m^2/g$, less than or equal to 2.1 $m^2/g$, less than or equal to 2.0 $m^2/g$, or less than or equal to 1.8 $m^2/g$. Combinations of the above-referenced ranges are also possible (e.g., greater than or equal to 1.6 $m^2/g$ and less than or equal to 5.0 $m^2/g$, greater than or equal to 1.6 $m^2/g$ and less than or equal to 2.5 $m^2/g$, or greater than or equal to 1.8 $m^2/g$ and less than or equal to 2.1 $m^2/g$). Other ranges are also possible. BET specific surface area may be determined in accordance with section 10 of Battery Council International Standard BCIS-03A (2015), "Recommended Battery Materials Specifications Valve Regulated Recombinant Batteries", section 10 being "Standard Test Method for Surface Area of Recombinant Battery Separator Mat". Following this technique, the BET specific surface area is measured via adsorption analysis using a BET surface analyzer (e.g., Micromeritics Gemini VII 2390 Surface Area Analyzer) with nitrogen gas; the sample amount is between 0.5 and 0.6 grams in a ¾" tube; and, the sample is allowed to degas at 100° C. for a minimum of 3 hours.

In some embodiments, the fine glass fibers (e.g., fine microglass fibers) are produced with a relatively high fiber manufacturing factor (FMF). For example, in some embodiments, the fine glass fibers (e.g., fine microglass fibers) are produced with a higher FMF than fine fibers that differ only in their average aspect ratio and/or BET specific surface area. In some embodiments, the fine glass fibers (e.g., fine microglass fibers) are produced with an average FMF of greater than or equal to 4 $lbs^{1/2}$/revolutions·inch, greater than or equal to 5 $lbs^{1/2}$/revolutions·inch, greater than or equal to 6 $lbs^{1/2}$/revolutions·inch, greater than or equal to 7 $lbs^{1/2}$/revolutions·inch, greater than or equal to 8 $lbs^{1/2}$/revolutions·inch, greater than or equal to 9 $lbs^{1/2}$/revolutions·inch, greater than or equal to 10 $lbs^{1/2}$/revolutions·inch, greater than or equal to 11 $lbs^{1/2}$/revolutions·inch, greater than or equal to 12 $lbs^{1/2}$/revolutions·inch, greater than or equal to 13 $lbs^{1/2}$/revolutions·inch, greater than or equal to 14 $lbs^{1/2}$/revolutions·inch, greater than or equal to 15 $lbs^{1/2}$/revolutions·inch, greater than or equal to 18 $lbs^{1/2}$/revolutions·inch, greater than or equal to 20 $lbs^{1/2}$/revolutions·inch, greater than or equal to 23 $lbs^{1/2}$/revolutions·inch, greater than or equal to 25 $lbs^{1/2}$/revolutions·inch, greater than or equal to 27 $lbs^{1/2}$/revolutions·inch, or greater than or equal to 29 $lbs^{1/2}$/revolutions·inch. In some embodiments, the fine glass fibers (e.g., fine microglass fibers) are produced with an average FMF of less than or equal to 30 $lbs^{1/2}$/revolutions·inch, less than or equal to 29 $lbs^{1/2}$/revolutions·inch, less than or equal to 28 $lbs^{1/2}$/revolutions·inch, less than or equal to 27 $lbs^{1/2}$/revolutions·inch, less than or equal to 26 $lbs^{1/2}$/revolutions·inch, less than or equal to 25 $lbs^{1/2}$/revolutions·inch, less than or equal to 23 $lbs^{1/2}$/revolutions·inch, less than or equal to 20 $lbs^{1/2}$/revolutions·inch, less than or equal to 19 $lbs^{1/2}$/revolutions·inch, less than or equal to 18 $lbs^{1/2}$/revolutions·inch, less than or equal to 17 $lbs^{1/2}$/revolutions·inch, less than or equal to 16 $lbs^{1/2}$/revolutions·inch, less than or equal to 15 $lbs^{1/2}$/revolutions·inch, less than or equal to 14 $lbs^{1/2}$/revolutions·inch, less than or equal to 13 $lbs^{1/2}$/ revolutions·inch, less than or equal to 12 $lbs^{1/2}$/revolutions·inch, less than or equal to 11 $lbs^{1/2}$/revolutions·inch, or less than or equal to 10 $lbs^{1/2}$/revolutions·inch. Combinations of the above-referenced ranges are also possible (e.g., greater than or equal to 4 $lbs^{1/2}$/revolutions·inch and less than or equal to 20 $lbs^{1/2}$/revolutions·inch, greater than or equal to 10 $lbs^{1/2}$/revolutions·inch and less than or equal to 18 $lbs^{1/2}$/revolutions·inch, or greater than or equal to 12 $lbs^{1/2}$/revolutions·inch and less than or equal to 16 $lbs^{1/2}$/revolutions·inch). Other ranges are also possible. FMF may be determined by the following equation: $FMF=F\times N/(D\times d\times f\times P^{1/2})$, where F=Total glass flow through the spinner in lbs/min, N=Total number of orifices in the spinner, D=Spinner diameter in inches, d=Diameter of the orifices in inches, f=Spinner speed in revolutions per minute, and P=Combustion pressure in psi.

In some embodiments, the fine glass fibers (e.g., fine microglass fibers) are produced with relatively low average carbon dioxide ($CO_2$) emissions. For example, in some embodiments, the fine glass fibers (e.g., fine microglass fibers) are produced with a lower average $CO_2$ emission than fine fibers that differ only in their average aspect ratio and/or BET specific surface area. In some embodiments, the fine glass fibers (e.g., fine microglass fibers) are produced with an average $CO_2$ emission of greater than or equal to 1 lbs $CO_2$/lbs fiber, greater than or equal to 2 lbs $CO_2$/lbs fiber, greater than or equal to 3 lbs $CO_2$/lbs fiber, greater than or equal to 4 lbs $CO_2$/lbs fiber, greater than or equal to 5 lbs $CO_2$/lbs fiber, greater than or equal to 6 lbs $CO_2$/lbs fiber, greater than or equal to 7 lbs $CO_2$/lbs fiber, greater than or equal to 8 lbs $CO_2$/lbs fiber, greater than or equal to 9 lbs $CO_2$/lbs fiber, greater than or equal to 10 lbs $CO_2$/lbs fiber, greater than or equal to 12 lbs $CO_2$/lbs fiber, greater than or equal to 15 lbs $CO_2$/lbs fiber, greater than or equal to 17 lbs $CO_2$/lbs fiber, greater than or equal to 20 lbs $CO_2$/lbs fiber, greater than or equal to 22 lbs $CO_2$/lbs fiber, or greater than or equal to 25 lbs $CO_2$/lbs fiber. In some embodiments, the fine glass fibers (e.g., fine microglass fibers) are produced with an average $CO_2$ emission of less than or equal to 30 lbs $CO_2$/lbs fiber, less than or equal to 28 lbs $CO_2$/lbs fiber, less than or equal to 25 lbs $CO_2$/lbs fiber, less than or equal to 23 lbs $CO_2$/lbs fiber, less than or equal to 20 lbs $CO_2$/lbs fiber, less than or equal to 18 lbs $CO_2$/lbs fiber, less than or equal to 15 lbs $CO_2$/lbs fiber, less than or equal to 13 lbs $CO_2$/lbs fiber, less than or equal to 10 lbs $CO_2$/lbs fiber, less than or equal to 9 lbs $CO_2$/lbs fiber, less than or equal to 8 lbs $CO_2$/lbs fiber, less than or equal to 7 lbs $CO_2$/lbs fiber, less than or equal to 6 lbs $CO_2$/lbs fiber, less than or equal to 5 lbs $CO_2$/lbs fiber, less than or equal to 4 lbs $CO_2$/lbs fiber, less than or equal to 3 lbs $CO_2$/lbs fiber, or less than or equal to 2 lbs $CO_2$/lbs fiber. Combinations of the above-referenced ranges are also possible (e.g., greater than or equal to 1 lbs $CO_2$/lbs fiber and less than or equal to 30 lbs $CO_2$/lbs fiber, greater than or equal to 1 lbs $CO_2$/lbs fiber and less than or equal to 10 lbs $CO_2$/lbs fiber, greater than or equal to 2 lbs $CO_2$/lbs fiber and less than or equal to 6 lbs $CO_2$/lbs fiber, or greater than or equal to 1 lbs $CO_2$/lbs fiber and less than or equal to 3 lbs $CO_2$/lbs fiber). Other ranges are also possible. Average $CO_2$ emission may be measured as the amount of $CO_2$ produced from gas combustion during fiber production (e.g., from molten glass) for a pound of fiber.

Some embodiments relate to a fiber web. FIG. 1 presents a top-view schematic of a nonlimiting fiber web 101, in accordance with some embodiments. In some embodiments, the fiber web comprises fine glass fibers (e.g., any embodiments, or combinations thereof, of the fine glass fibers disclosed herein).

In embodiments where the fiber web comprises fine glass fibers (e.g., fine microglass fibers), the fiber web may comprise a variety of suitable amounts thereof. For example, in some embodiments, the fiber web comprises greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, greater than or equal to 90 wt %, or greater than or equal to 95 wt % fine glass fibers (e.g., fine microglass fibers). In some embodiments, the fiber web comprises less than or equal to 100 wt %, less than or equal to 95 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 55 wt %. less than or equal to 50 wt %, less than or equal to 45 wt %, or less than or equal to 40 wt % fine glass fibers (e.g., fine microglass fibers). Combinations of the above-referenced ranges are also possible (e.g., greater than or equal to 5 wt % and less than or equal to 100 wt %, greater than or equal to 20 wt % and less than or equal to 100 wt %, greater than or equal to 50 wt % and less than or equal to 100 wt %, or greater than or equal to 80 wt % and less than or equal to 100 wt %). Other ranges are also possible.

In some embodiments, the fiber web comprises coarse glass fibers (e.g., the fiber web comprises fine glass fibers and coarse glass fibers, or the fiber web comprises fine glass fibers, coarse glass fibers, and strengthening fibers). According to some embodiments, the coarse glass fibers comprise microglass fibers. Microglass fibers may comprise fibers produced by drawing a melt of glass from brushing tips into continuous fibers and then subjecting the continuous fibers to a flame blowing process and/or a rotary spinning process. It is also possible for microglass fibers to comprise fibers formed by a remelting process.

The coarse glass fibers (e.g., coarse microglass fibers) may have a variety of suitable glass chemistries. As non-limiting examples, in some embodiments, the coarse glass fibers (e.g., coarse microglass fibers) comprise M-glass, B-glass, C-glass, Advantex glass, 481 glass, and/or 10-20 wt % alkali metal oxides (e.g., sodium oxides and/or magnesium oxides).

In embodiments where the fiber web comprises coarse glass fibers (e.g., coarse microglass fibers), the fiber web may comprise a variety of suitable amounts thereof. For example, in some embodiments, the fiber web comprises greater than or equal to 0 wt %, greater than or equal to 1 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, or greater than or equal to 60 wt % coarse glass fibers (e.g., coarse microglass fibers). In some embodiments, the fiber web comprises less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, or less than or equal to 20 wt % coarse glass fibers (e.g., coarse microglass fibers). Combinations of the above-referenced ranges are also possible (e.g., greater than or equal to 0 wt % and less than or equal to 80 wt %, greater than or equal to 0 wt % and less than or equal to 50 wt %, greater than or equal to 0 wt % and less than or equal to 20 wt %, greater than or equal to 1 wt % and less than or equal to 80 wt %, greater than or equal to 1 wt % and less than or equal to 50 wt %, or greater than or equal to 1 wt % and less than or equal to 20 wt %.). Other ranges are also possible.

In embodiments where the fiber web comprises coarse glass fibers (e.g., coarse microglass fibers), the coarse glass fibers may have any suitable diameter. For example, in some embodiments, the coarse glass fibers (e.g., coarse microglass fibers) have an average diameter of greater than or equal to 1.6 microns, greater than or equal to 1.8 microns, greater than or equal to 2.0 microns, greater than or equal to 2.2 microns, greater than or equal to 2.4 microns, greater than or equal to 2.6 microns, greater than or equal to 2.8 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 12 microns, greater than or equal to 14 microns, greater than or equal to 16 microns, greater than or equal to 18 microns, or greater than or equal to 20 microns. In some embodiments, the coarse glass fibers (e.g., coarse microglass fibers) have an average diameter of less than or equal 25 microns, less than or equal 24 microns, less than or equal 23 microns, less than or equal 22 microns, less than or equal 21 microns, less than or equal 20 microns, less than or equal 19 microns, less than or equal 18 microns, less than or equal 17 microns, less than or equal 16 microns, less than or equal 15 microns, less than or equal 14 microns, less than or equal 13 microns, less than or equal 12 microns, less than or equal 11 microns, less than or equal 10 microns, less than or equal 9 microns, less than or equal 8 microns, less than or equal 7 microns, less than or equal 6 microns, less than or equal 5 microns, less than or equal 4 microns, or less than or equal 3 microns. Combinations of the above-referenced ranges are also possible (e.g., greater than or equal to 1.6 microns and less than or equal to 25 microns, greater than or equal to 1.6 microns and less than or equal to 10 microns, or greater than or equal to 1.6 microns and less than or equal to 3 microns). Other ranges are also possible. The average diameter (D) of the coarse glass fibers may be calculated using the BET specific surface area (measured as disclosed elsewhere herein) according to the following equation: D=4/Sd, wherein S is the BET specific surface area of 1 gram of fiber in $m^2/g$ and d is the density of the fiber in $g/cm^3$.

In embodiments where the fiber web comprises coarse glass fibers (e.g., coarse microglass fibers), the coarse glass fibers may have any suitable length. For example, in some embodiments, the coarse glass fibers (e.g., coarse microglass fibers) have an average length of greater than or equal to 0.05 mm, greater than or equal to 0.1 mm, greater than or equal to 0.15 mm, greater than or equal to 0.2 mm, greater than or equal to 0.25 mm, greater than or equal to 0.3 mm, greater than or equal to 0.35 mm, greater than or equal to 0.4 mm, greater than or equal to 0.45 mm, greater than or equal to 0.5 mm, greater than or equal to 0.55 mm, greater than or equal to 0.6 mm, greater than or equal to 0.65 mm, or greater than or equal to 0.7 mm. In some embodiments, the coarse glass fibers (e.g., coarse microglass fibers) have an average length of less than or equal to 1 mm, less than or equal to 0.95 mm, less than or equal to 0.9 mm, less than or equal to 0.85 mm, less than or equal to 0.8 mm, less than or equal to 0.75 mm, less than or equal to 0.7 mm, less than or equal to 0.65 mm, less than or equal to 0.6 mm, less than or equal to 0.55 mm, less than or equal to 0.5 mm, less than or equal to 0.45 mm, less than or equal to 0.4 mm, less than or equal to 0.35 mm, less than or equal to 0.3 mm, less than or equal to 0.25 mm, or less than or equal to 0.2 mm. Combinations of the above-referenced ranges are also possible (e.g., greater than or equal to 0.05 mm and less than or equal to 1 mm, greater than or equal to 0.05 mm and less than or equal to 0.5 mm, or greater than or equal to 0.05 mm and less than or equal to 0.2 mm). Other ranges are also possible. The average length of the coarse glass fibers may be measured using a Diamscope and measuring at least 10,000 fibers.

In embodiments where the fiber web comprises coarse glass fibers (e.g., coarse microglass fibers), the coarse glass fibers may have any suitable aspect ratio. For example, in some embodiments, the coarse glass fibers (e.g., coarse microglass fibers) have an average aspect ratio of greater than or equal to 10, greater than or equal to 15, greater than or equal to 20, greater than or equal to 25, greater than or equal to 30, greater than or equal to 35, greater than or equal to 40, greater than or equal to 45, greater than or equal to 50, greater than or equal to 60, greater than or equal to 70, greater than or equal to 80, greater than or equal to 90, greater than or equal to 100, greater than or equal to 110, greater than or equal to 120, greater than or equal to 130, greater than or equal to 140, or greater than or equal to 150. In some embodiments, the coarse glass fibers (e.g., coarse microglass fibers) have an average aspect ratio of less than or equal to 200, less than or equal to 195, less than or equal to 190, less than or equal to 185, less than or equal to 180, less than or equal to 175, less than or equal to 170, less than or equal to 165, less than or equal to 160, less than or equal to 155, less than or equal to 150, less than or equal to 145, less than or equal to 140, less than or equal to 135, less than or equal to 130, less than or equal to 125, less than or equal to 120, less than or equal to 115, less than or equal to 110, less than or equal to 105, less than or equal to 100, less than or equal to 90, less than or equal to 80, less than or equal to 70, less than or equal to 60, or less than or equal to 50. Combinations of the above-referenced ranges are also possible (e.g., greater than or equal to 10 and less than or equal to 200, greater than or equal to 15 and less than or equal to 150, greater than or equal to 40 and less than or equal to 120). Other ranges are also possible. The average aspect ratio of the coarse glass fibers may be measured by dividing the average length by the average diameter (using the same unit for both length and diameter) for at least 10,000 fibers, wherein both the length and diameter are measured using a Diamscope.

In embodiments where the fiber web comprises coarse glass fibers (e.g., coarse microglass fibers), the coarse glass fibers may have any suitable BET specific surface area. For example, in some embodiments, the coarse glass fibers (e.g., coarse microglass fibers) have an average BET specific surface area of greater than or equal to 0.1 $m^2/g$, greater than or equal to 0.2 $m^2/g$, greater than or equal to 0.3 $m^2/g$, greater than or equal to 0.4 $m^2/g$, greater than or equal to 0.5 $m^2/g$, greater than or equal to 0.6 $m^2/g$, greater than or equal to 0.7 $m^2/g$, greater than or equal to 0.8 $m^2/g$, greater than or equal to 0.9 $m^2/g$, greater than or equal to 1 $m^2/g$, greater than or equal to 1.1 $m^2/g$, or greater than or equal to 1.2

$m^2/g$. In some embodiments, the coarse glass fibers (e.g., coarse microglass fibers) have an average BET specific surface area of less than or equal to 1.6 $m^2/g$, less than or equal to 1.55 $m^2/g$, less than or equal to 1.5 $m^2/g$, less than or equal to 1.45 $m^2/g$, less than or equal to 1.4 $m^2/g$, less than or equal to 1.35 $m^2/g$, less than or equal to 1.3 $m^2/g$, less than or equal to 1.25 $m^2/g$, less than or equal to 1.2 $m^2/g$, less than or equal to 1.15 $m^2/g$, less than or equal to 1.1 $m^2/g$, less than or equal to 1.05 $m^2/g$, less than or equal to 1.0 $m^2/g$, less than or equal to 0.9 $m^2/g$, less than or equal to 0.8 $m^2/g$, less than or equal to 0.7 $m^2/g$, or less than or equal to 0.6 $m^2/g$. Combinations of the above-referenced ranges are also possible (e.g., greater than or equal to 0.1 $m^2/g$ and less than or equal to 1.6 $m^2/g$, greater than or equal to 0.5 $m^2/g$ and less than or equal to 1.6 $m^2/g$, or greater than or equal to 0.5 $m^2/g$ and less than or equal to 1.2 $m^2/g$). Other ranges are also possible.

In embodiments where the fiber web comprises coarse glass fibers (e.g., coarse microglass fibers), the coarse glass fibers (e.g., coarse microglass fibers) are produced with a variety of suitable average $CO_2$ emissions. For example, in some embodiments, the coarse glass fibers are produced with an average $CO_2$ emission of greater than or equal to 1 lbs $CO_2$/lbs fiber, greater than or equal to 2 lbs $CO_2$/lbs fiber, greater than or equal to 3 lbs $CO_2$/lbs fiber, greater than or equal to 4 lbs $CO_2$/lbs fiber, greater than or equal to 5 lbs $CO_2$/lbs fiber, greater than or equal to 6 lbs $CO_2$/lbs fiber, greater than or equal to 8 lbs $CO_2$/lbs fiber, greater than or equal to 10 lbs $CO_2$/lbs fiber, greater than or equal to 12 lbs $CO_2$/lbs fiber, greater than or equal to 15 lbs $CO_2$/lbs fiber, greater than or equal to 17 lbs $CO_2$/lbs fiber, greater than or equal to 20 lbs $CO_2$/lbs fiber, greater than or equal to 22 lbs $CO_2$/lbs fiber, or greater than or equal to 25 lbs $CO_2$/lbs fiber. In some embodiments, the coarse glass fibers (e.g., coarse microglass fibers) are produced with an average $CO_2$ emission of less than or equal to 30 lbs $CO_2$/lbs fiber, less than or equal to 28 lbs $CO_2$/lbs fiber, less than or equal to 25 lbs $CO_2$/lbs fiber, less than or equal to 23 lbs $CO_2$/lbs fiber, less than or equal to 20 lbs $CO_2$/lbs fiber, less than or equal to 18 lbs $CO_2$/lbs fiber, less than or equal to 15 lbs $CO_2$/lbs fiber, less than or equal to 13 lbs $CO_2$/lbs fiber, less than or equal to 10 lbs $CO_2$/lbs fiber, less than or equal to 9 lbs $CO_2$/lbs fiber, less than or equal to 8 lbs $CO_2$/lbs fiber, less than or equal to 7 lbs $CO_2$/lbs fiber, less than or equal to 6 lbs $CO_2$/lbs fiber, less than or equal to 5 lbs $CO_2$/lbs fiber, less than or equal to 4 lbs $CO_2$/lbs fiber, less than or equal to 3 lbs $CO_2$/lbs fiber, or less than or equal to 2 lbs $CO_2$/lbs fiber. Combinations of the above-referenced ranges are also possible (e.g., greater than or equal to 1 lbs $CO_2$/lbs fiber and less than or equal to 30 lbs $CO_2$/lbs fiber, greater than or equal to 1 lbs $CO_2$/lbs fiber and less than or equal to 10 lbs $CO_2$/lbs fiber, greater than or equal to 2 lbs $CO_2$/lbs fiber and less than or equal to 6 lbs $CO_2$/lbs fiber, greater than or equal to 1 lbs $CO_2$/lbs fiber and less than or equal to 3 lbs $CO_2$/lbs fiber, or greater than or equal to 2 lbs $CO_2$/lbs fiber and less than or equal to 3 lbs $CO_2$/lbs fiber). Other ranges are also possible. Average $CO_2$ emission may be measured as the amount of $CO_2$ produced from gas combustion during fiber production (e.g., from molten glass) for a pound of fiber.

In some embodiments, the fiber web comprises strengthening fibers (e.g., the fiber web comprises fine glass fibers and strengthening fibers, or fine glass fibers, coarse glass fibers, and strengthening fibers). Without wishing to be bound by theory, it is believed that, in some cases, use of fine glass fibers disclosed herein results in a fiber web with lower tensile strength than use of fine glass fibers having a higher aspect ratio, all other factors being equal, but that, in some such instances, combination of the fine glass fibers disclosed herein with strengthening fibers provides substantially similar or improved tensile strength while providing other advantages (e.g., higher FMF, lower cost, lower carbon dioxide emissions, fewer flocks, increased clongation at break, relatively low electrical resistance, increased surface area, smaller maximum pore size, and/or smaller mean pore size) compared to fiber webs with fine glass fibers having higher aspect ratios, all other factors being equal.

According to some embodiments, the strengthening fibers are produced by extrusion and, optionally, are cut to length. Non-limiting examples of strengthening fibers (e.g., synthetic fibers and/or polymeric fibers) include fibers comprising cellulose, acrylics, liquid crystalline polymers, polyoxazoles, aramids, p-aramids, polyethylenes, polyesters, polyamides, cotton, polyolefins, and/or olefins, such as Trevira T255 (e.g., PE sheath bicomponent polyester fiber) (e.g., 1.3 dtex, 3 dtex), Advansa 271P, Unitika 4080 and 6080 (e.g., 1.1 to 3 dtex), Huvis LMF SD 1.5 (e.g., Copolyester sheath bicomponent polyester fiber), Fibrillated polyolefin pulp (e.g., Fybrel EST-7), Lyocell-solution spun cellulose pulp (e.g., 120 ml to 400 ml CSF), Softwood pulp (e.g., cedar and other coniferous), and non-wood pulps (e.g., Bamboo, Abaca, Sisal, Esparto, Kenaf, Hemp, and/or Jute). In some embodiments, the strengthening fibers (e.g., synthetic fibers and/or polymeric fibers) comprise multicomponent fibers such as bicomponent fibers, e.g., splittable bicomponent fibers, such as segmented pie and/or islands in the sea-type fibers, as described in more detail below. Additionally, in some embodiments, the strengthening fibers (e.g., synthetic fibers and/or polymeric fibers) comprise water soluble fiber-type polyvinyl alcohol (e.g., Kuraray SPG-056).

In some embodiments, the cellulose fibers comprise natural cellulose fibers, such as cellulose wood (e.g., cedar), softwood fibers, and/or hardwood fibers. Exemplary softwood fibers include fibers obtained from mercerized southern pine ("mercerized southern pine fibers or HPZ fibers"), northern bleached softwood kraft (e.g., fibers obtained from Robur Flash ("Robur Flash fibers")), southern bleached softwood kraft (e.g., fibers obtained from Brunswick pine ("Brunswick pine fibers")), or chemically treated mechanical pulps ("CTMP fibers"). For example, HPZ fibers can be obtained from Buckeye Technologies, Inc., Memphis, TN; Robur Flash fibers can be obtained from Rottneros AB, Stockholm, Sweden; and Brunswick pine fibers can be obtained from Georgia-Pacific, Atlanta, GA. Exemplary hardwood fibers include fibers obtained from Eucalyptus ("Eucalyptus fibers"). Eucalyptus fibers are commercially available from, e.g., (1) Suzano Group, Suzano, Brazil ("Suzano fibers"), (2) Group Portucel Soporcel, Cacia, Portugal ("Cacia fibers"), (3) Tembec, Inc., Temiscaming, QC, Canada ("Tarascon fibers"), (4) Kartonimex Intercell, Duesseldorf, Germany, ("Acacia fibers"), (5) Mead-Westvaco, Stamford, CT ("Westvaco fibers"), and (6) Georgia-Pacific, Atlanta, GA ("Leaf River fibers").

In some embodiments, the cellulose fibers comprise cellulose fibers other than natural cellulose fibers. As an example, the cellulose fibers may comprise regenerated and/or synthetic cellulose such as lyocell, rayon, and celluloid. As another example, the cellulose fibers may comprise natural cellulose derivatives, such as cellulose acetate and carboxymethylcellulose.

Cellulose fibers, when present, may comprise fibrillated cellulose fibers, and/or may comprise unfibrillated cellulose fibers.

In some embodiments, the strengthening fibers comprise synthetic fibers and/or polymeric fibers. In some embodiments, the synthetic fibers comprise a poly(olefin) (e.g., poly(propylene), poly(ethylene)), an acrylic (e.g., a dryspun acrylic, a modacrylic, a wetspun acrylic), a halogenated polymer (e.g., a fluorinated polymer, such as poly(vinyl chloride), poly(tetrafluoroethylene), and/or poly(vinylidine fluoride)), poly(styrene), poly(sulfone), poly(ethersulfone), a poly(carbonate), a nylon, a poly(urethane), a phenolic resin, a poly(ester), a poly(aramid) (e.g., a para-poly(aramid), a meta-poly(aramid), Kevlar, Nomex), a poly(imide), poly(phenylene oxide), poly(phenylene sulfide), poly(methyl pentene), poly(ether ketone), a liquid crystal polymer (e.g., poly(p-phenylene-2,6-benzobisoxazole; a poly(ester)-based liquid crystal polymer, such as a polymer produced by the polycondensation of 4-hydroxybenzoic acid and 6-hydroxynaphthalene-2-carboxylic acid), regenerated cellulose, celluloid, cellulose acetate, and/or carboxymethylcellulose.

In some embodiments, the strengthening fibers comprise multicomponent (e.g., bicomponent) fibers. Such fibers may comprise two or more components having different chemical compositions from each other, some or all of which may be synthetic. Non-limiting examples of suitable materials that may be present in a component of a multicomponent fiber include poly(olefin) s such as poly(ethylene), poly(propylene), and poly(butylene); polyesters and/or co-polyesters such as poly(ethylene terephthalate), co-poly(ethylene terephthalate), poly(butylene terephthalate), and poly(ethylene isophthalate); polyamides and co-polyamides such as nylons and aramids; and halogenated polymers such as poly(tetrafluoroethylene).

When present, multicomponent fibers may have a variety of suitable structures. In some embodiments, the multicomponent fibers comprise bicomponent fibers (i.e., fibers including two components). The bicomponent fibers may have a variety of suitable structures, such as core/sheath fibers (e.g., concentric core/sheath fibers, non-concentric core/sheath fibers), segmented pie fibers, split fibers, side-by-side fibers, tip-trilobal fibers, and "island in the sea" fibers. In some embodiments, a fiber web may comprise a multicomponent fiber that initially had one of the above-referenced structures, but underwent a process (e.g., a splitting process) during fabrication of the fiber web to form a different structure. By way of example, some fiber webs may comprise fibers that were initially bicomponent fibers but were split during fiber web fabrication to form finer fibers.

When core/sheath bicomponent fibers are present, the sheath may have a lower melting temperature than the core. When heated, the sheath may melt prior to the core, binding other fibers within the fiber web together while the core remains solid. Non-limiting examples of suitable bicomponent fibers, in which the component with the lower melting temperature is listed first and the component with the higher melting temperature is listed second, include the following: poly(ethylene)/poly(ethylene terephthalate), poly(propylene)/poly(ethylene terephthalate), co-poly(ethylene terephthalate)/poly(ethylene terephthalate), poly(butylene terephthalate)/poly(ethylene terephthalate), co-polyamide/polyamide, and poly(ethylene)/poly(propylene).

Without wishing to be bound by any theory, it is believed that, in some instances, inclusion of bicomponent fibers in a fiber web increases the tensile strength (e.g., to compensate for loss of tensile strength due to use of fine fibers disclosed herein, in some cases) and/or durability (e.g., during acid filling) compared to a fiber web without bicomponent fibers, all other factors being useful.

In some embodiments, the strengthening fibers comprise fibrillated fibers. The fibrillated strengthening fibers may have a variety of suitable Canadian Standard Freeness (CSF). For example, in some embodiments, the fibrillated strengthening fibers have an average of greater than or equal to 20 CSF, greater than or equal to 30 CSF, greater than or equal to 40 CSF, greater than or equal to 50 CSF, greater than or equal to 75 CSF, greater than or equal to 100 CSF. greater than or equal to 120 CSF, greater than or equal to 125 CSF, greater than or equal to 150 CSF, greater than or equal to 200 CSF, greater than or equal to 250 CSF, greater than or equal to 300 CSF, greater than or equal to 350 CSF, greater than or equal to 400 CSF, greater than or equal to 450 CSF, or greater than or equal to 500 CSF. In some embodiments, the fibrillated strengthening fibers have an average of less than or equal to 650 CSF, less than or equal to 640 CSF, less than or equal to 630 CSF, less than or equal to 620 CSF, less than or equal to 610 CSF, less than or equal to 600 CSF, less than or equal to 575 CSF, less than or equal to 550 CSF, less than or equal to 525 CSF, less than or equal to 500 CSF, less than or equal to 450 CSF, less than or equal to 400 CSF, less than or equal to 350 CSF, less than or equal to 300 CSF, less than or equal to 250 CSF, less than or equal to 200 CSF, less than or equal to 150 CSF, or less than or equal to 100 CSF. Combinations of the above-referenced ranges are also possible (e.g., greater than or equal to 20 CSF and less than or equal to 650 CSF or greater than or equal to 120 CSF and less than or equal to 500 CSF). Other ranges are also possible. The Canadian Standard Freeness of the cellulose fibers may be measured according to a Canadian Standard Freeness test, specified by TAPPI test method T-227-OM-09 Freeness of pulp. The test can provide an average CSF value.

In embodiments where the fiber web comprises strengthening fibers, the fiber web may comprise a variety of suitable amounts thereof. For example, in some embodiments, the fiber web comprises greater than or equal to 0 wt %, greater than or equal to 1 wt %, greater than or equal to 2 wt %, greater than or equal to 3 wt %, greater than or equal to 4 wt %, greater than or equal to 5 wt %, greater than or equal to 10 wt %, greater than or equal to 15 wt %, greater than or equal to 20 wt %, greater than or equal to 25 wt %, or greater than or equal to 30 wt % strengthening fibers (e.g., synthetic fibers and/or multicomponent fibers). In some embodiments, the fiber web comprises less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 9 wt %, less than or equal to 8 wt %, less than or equal to 7 wt %, less than or equal to 6 wt %, or less than or equal to 5 wt % strengthening fibers (e.g., synthetic fibers and/or multicomponent fibers). Combinations of the above-referenced ranges are also possible (e.g., greater than or equal to 0 wt % and less than or equal to 40 wt %, greater than or equal to 0 wt % and less than or equal to 15 wt %, or greater than or equal to 2 wt % and less than or equal to 6 wt %). Other ranges are also possible. In embodiments where the fiber web comprises strengthening fibers, the strengthening fibers may have a variety of suitable diameters. For example, in some embodiments, the strengthening fibers (e.g., synthetic fibers and/or multicomponent fibers) have an average diameter of greater than or equal to 3 microns, greater than or equal to 4 microns, greater than or equal to 5 microns, greater than or equal to 7 microns, greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, greater than or equal to 45 microns, or greater than or equal to 50 microns. In some embodiments, the strengthening fibers (e.g., synthetic fibers and/or multicomponent fibers) have an average diameter of less than or equal to 100 microns, less than or equal to 95 microns, less than or equal to 90 microns, less than or equal to 85 microns, less than or equal to 80 microns, less than or equal to 75 microns, less than or equal to 70 microns, less than or equal to 65 microns, less than or equal to 60 microns, less than or equal to 55 microns, less than or equal to 50 microns, less than or equal to 45 microns, less than or equal to 40 microns, less than or equal to 35 microns, less than or equal to 30 microns, less than or equal to 25 microns, less than or equal to 20 microns, or less than or equal to 15 microns. Combinations of the above-referenced ranges are also possible (e.g., greater than or equal to 3 microns and less than or equal to 100 microns, greater than or equal to 5 microns and less than or equal to 30 microns, or greater than or equal to 10 microns and less than or equal to 20 microns). Other ranges are also possible. The average diameter (D) of the synthetic fibers may be measured with SEM (scanning electron microscopy).

In embodiments where the fiber web comprises strengthening fibers, the strengthening fibers may have a variety of suitable lengths. For example, in some embodiments, the strengthening fibers (e.g., synthetic fibers and/or multicomponent fibers) have an average length of greater than or equal to 2 mm, greater than or equal to 3 mm, greater than or equal to 4 mm, greater than or equal to 5 mm, greater than or equal to 6 mm, greater than or equal to 7 mm, greater than or equal to 8 mm, greater than or equal to 9 mm, greater than or equal to 10 mm, greater than or equal to 12 mm, greater than or equal to 15 mm, greater than or equal to 20 mm, greater than or equal to 25 mm, greater than or equal to 30 mm, greater than or equal to 35 mm, or greater than or equal to 40 mm. In some embodiments, the strengthening fibers (e.g., synthetic fibers and/or multicomponent fibers) have an average length of less than or equal to 50 mm, less than or equal to 48 mm, less than or equal to 45 mm, less than or equal to 40 mm, less than or equal to 35 mm, less than or equal to 30 mm, less than or equal to 25 mm, less than or equal to 20 mm, less than or equal to 15 mm, or less than or equal to 10 mm. Combinations of the above-referenced ranges are also possible (e.g., greater than or equal to 2 mm and less than or equal to 50 mm, greater than or equal to 3 mm and less than or equal to 25 mm, or greater than or equal to 6 mm and less than or equal to 15 mm). Length of the strengthening fibers may be measured with SEM.

In some embodiments, the strengthening fiber comprises chopped strand glass fibers (e.g., in addition to other strengthening fibers or instead of other strengthening fibers). The chopped strand glass fibers may comprise fibers produced by drawing a melt of glass from brushing tips into continuous fibers and then cutting the continuous fibers into short fibers. The chopped strand glass fibers may have a variety of suitable glass chemistries. As a non-limiting example, in some embodiments, the chopped strand glass fibers comprise M-glass, B-glass, C-glass, Advantex glass, 481 glass, and/or 10-20 wt % alkali metal oxides (e.g., sodium oxides and/or magnesium oxides).

In embodiments where the fiber web comprises chopped strand glass fibers, the fiber web may have a variety of suitable amounts of chopped strand glass fibers. For example, in some embodiments, the fiber web comprises greater than or equal to 0 wt %, greater than or equal to 0.1 wt %, greater than or equal to 0.2 wt %, greater than or equal to 0.5 wt %, greater than or equal to 0.75 wt %, greater than or equal to 1 wt %, greater than or equal to 1.25 wt %, greater than or equal to 1.5 wt %, greater than or equal to 1.75 wt %, greater than or equal to 2 wt %, greater than or equal to 2.25 wt %, greater than or equal to 2.5 wt %, greater than or equal to 2.75 wt %, greater than or equal to 3 wt %, greater than or equal to 3.5 wt %, greater than or equal to 4 wt %, greater than or equal to 5 wt %, greater than or equal to 6 wt %, greater than or equal to 7.5 wt %, greater than or equal to 10 wt %, greater than or equal to 12.5 wt %, greater than or equal to 15 wt %, greater than or equal to 17.5 wt %, greater than or equal to 20 wt %, greater than or equal to 22.5 wt %, greater than or equal to 25 wt %, greater than or equal to 30 wt %, or greater than or equal to 35 wt % chopped strand glass fibers. In some embodiments, the fiber web comprises less than or equal to 40 wt %, less than or equal to 35 wt %, less than or equal to 30 wt %, less than or equal to 25 wt %, less than or equal to 22.5 wt %, less than or equal to 20 wt %, less than or equal to 17.5 wt %, less than or equal to 15 wt %, less than or equal to 12.5 wt %, less than or equal to 10 wt %. less than or equal to 7.5 wt %, less than or equal to 5 wt %, less than or equal to 4 wt %, less than or equal to 3.5 wt %, less than or equal to 3 wt %, less than or equal to 2.75 wt %, less than or equal to 2.5 wt %, less than or equal to 2.25 wt %, less than or equal to 2 wt %, less than or equal to 1.75 wt %, less than or equal to 1.5 wt %, less than or equal to 1.25 wt %, less than or equal to 1 wt %, less than or equal to 0.75 wt %, less than or equal to 0.5 wt %, less than or equal to 0.2 wt %. or less than or equal to 0.1 wt % of chopped strand glass fibers. Combinations of the above-referenced ranges are also possible (e.g., greater than or equal to 0 wt % and less than or equal to 40 wt %, greater than or equal to 0.1 wt % and less than or equal to 40 wt %, greater than or equal to 4 wt % and less than or equal to 15 wt %, or greater than or equal to 6 wt % and less than or equal to 10 wt %). Other ranges are also possible.

In embodiments where the fiber web comprises chopped strand glass fibers, the chopped strand glass fibers may have a variety of suitable diameters. For example, in some embodiments, the chopped strand glass fibers have an average diameter of greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 12.5 microns, greater than or equal to 15 microns, greater than or equal to 17.5 microns, greater than or equal to 20 microns, or greater than or equal to 22.5 microns. In some embodiments, the chopped strand glass fibers have an average diameter of less than or equal to 30 microns, less than or equal to 29 microns, less than or equal to 28 microns, less than or equal to 27 microns, less than or equal to 26 microns, less than or equal to 25 microns, less than or equal to 24 microns, less than or equal to 23 microns, less than or equal to 22 microns, less than or equal to 21 microns, less than or equal to 20 microns, less than or equal to 17.5 microns, less than or equal to 15 microns, less than or equal to 12.5 microns, less than or equal to 10 microns, less than or equal to 9 microns, less than or equal to 8 microns, less than or equal to 7 microns, less than or equal to 6 microns, or less than or equal to 5 microns. Combinations of the above-referenced ranges are also possible (e.g., greater than or equal to 3 microns and less than or equal to 30 microns, greater than or equal to 5 microns and less than or equal to 25 microns, or greater than or equal to 10 microns and less than or equal to 20 microns). Other ranges are also possible. The average diameter (D) of the chopped strand glass fibers may be measured with SEM.

In embodiments where the fiber web comprises chopped strand glass fibers, the chopped strand glass fibers may have a variety of suitable lengths. For example, in some embodiments, the chopped strand glass fibers have an average length of greater than or equal to 2 mm, greater than or equal to 2.5 mm, greater than or equal to 3 mm, greater than or equal to 3.5 mm, greater than or equal to 4 mm, greater than or equal to 4.5 mm, greater than or equal to 5 mm, greater than or equal to 5.5 mm, greater than or equal to 6 mm, greater than or equal to 6.5 mm, greater than or equal to 7 mm, greater than or equal to 8 mm, greater than or equal to 9 mm, greater than or equal to 10 mm, greater than or equal to 12.5 mm, greater than or equal to 15 mm, greater than or equal to 17.5 mm, greater than or equal to 20 mm, or greater than or equal to 22.5 mm. In some embodiments, the chopped strand glass fibers have an average length of less than or equal to 50 mm, less than or equal to 45 mm, less than or equal to 40 mm, less than or equal to 35 mm, less than or equal to 30 mm, less than or equal to 25 mm, less than or equal to 22.5 mm, less than or equal to 20 mm, less than or equal to 17.5 mm, less than or equal to 15 mm, less than or equal to 10 mm, less than or equal to 8 mm, less than or equal to 7 mm, less than or equal to 6 mm, or less than or equal to 5 mm. Combinations of the above-referenced ranges are also possible (e.g., greater than or equal to 2 mm and less than or equal to 50 mm, greater than or equal to 3 mm and less than or equal to 25 mm, or greater than or equal to 6 mm and less than or equal to 15 mm). Other ranges are also possible. The average length of the chopped strand glass fibers may be measured using measured with SEM.

In some embodiments, the fiber web comprises an additive (e.g., in addition to fine glass fibers, coarse glass fibers, and/or strengthening fibers). For example, in some embodiments, the additive comprises non-fibrous organic particles and/or non-fibrous inorganic particles, such as precipitated, fumed, or colloidal silica (e.g., with surface areas of 100 $m^2/g$ to 1000 $m^2/g$ at loadings from 1% to 60%); diatomaceous earth (e.g., fresh and salt water diatoms); polyolefin porous beads; porous latex; and/or rubber particles, such as synthetic SBR rubber and natural rubber. In embodiments where the fiber web comprises an additive, the fiber web may comprise any suitable amount of the additive. For example, in some embodiments, the fiber web comprises greater than or equal to 1 wt %, greater than or equal to 3 wt %, greater than or equal to 5 wt %, greater than or equal to 7 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, or greater than or equal to 55 wt % additive (e.g., of an individual additive and/or of total additives). In some embodiments, the fiber web comprises less than or equal to 60 wt %, less than or equal to 55 wt %, less than or equal to 50 wt %, less than or equal to 45 wt %, less than or equal to 40 wt %, less than or equal to 35 wt %. less than or equal to 30 wt %, less than or equal to 25 wt %, less than or equal to 20 wt %, less than or equal to 15 wt %, less than or equal to 10 wt %, or less than or equal to 5 wt % additive (e.g., of an individual additive and/or of total additives). Combinations of the above-referenced ranges are also possible (e.g., greater than or equal to 1 wt % and less than or equal to 60 wt %, greater than or equal to 5 wt % and less than or equal to 50 wt %, or greater than or equal to 10 wt % and less than or equal to 40 wt %). Other ranges are also possible.

In some embodiments, a battery separator comprises a fiber web described herein. Non-limiting examples of separators comprise leaf separators, folded separators, pocket separators, z-fold separators, sleeve separators, corrugated separators, C-wrap separators, and U-wrap separators.

The fiber web and/or separator may have a variety of suitable thicknesses. For example, in some embodiments, the fiber web and/or separator has a thickness of greater than or equal to 0.15 mm, greater than or equal to 0.2 mm, greater than or equal to 0.25 mm, greater than or equal to 0.3 mm, greater than or equal to 0.4 mm, greater than or equal to 0.5 mm, greater than or equal to 0.6 mm, greater than or equal to 0.7 mm, greater than or equal to 0.8 mm, greater than or equal to 0.9 mm, greater than or equal to 1 mm, greater than or equal to 1.1 mm, greater than or equal to 1.2 mm, greater than or equal to 1.3 mm, greater than or equal to 1.4 mm, greater than or equal to 1.5 mm, greater than or equal to 1.75 mm, greater than or equal to 2 mm, greater than or equal to 2.25 mm, greater than or equal to 2.5 mm, greater than or equal to 2.75 mm, or greater than or equal to 3 mm. In some embodiments, the fiber web and/or separator has a thickness of less than or equal to 5 mm, less than or equal to 4.9 mm, less than or equal to 4.8 mm, less than or equal to 4.7 mm, less than or equal to 4.6 mm, less than or equal to 4.5 mm, less than or equal to 4.25 mm, less than or equal to 4 mm, less than or equal to 3.75 mm, less than or equal to 3.5 mm, less than or equal to 3.25 mm, less than or equal to 3 mm, less than or equal to 2.75 mm, less than or equal to 2.5 mm, less than or equal to 2.25 mm, less than or equal to 2 mm, less than or equal to 1.75 mm, less than or equal to 1.5 mm, less than or equal to 1.25 mm, or less than or equal to 1 mm. Combinations of the above-referenced ranges are also possible (e.g., greater than or equal to 0.15 mm and less than or equal to 5 mm, greater than or equal to 1 mm and less than or equal to 3 mm, or greater than or equal to 1 mm and less than or equal to 2 mm). Other ranges are also possible. The thickness may be measured according to BCIS-03A, Sept-09, Method 10 under 10 kPa applied pressure.

The fiber web and/or separator may have a variety of suitable basis weights. For example, in some embodiments, the fiber web and/or separator has a basis weight of greater than or equal to 20 $g/m^2$, greater than or equal to 25 $g/m^2$, greater than or equal to 30 $g/m^2$, greater than or equal to 35 $g/m^2$, greater than or equal to 40 $g/m^2$, greater than or equal to 45 $g/m^2$, greater than or equal to 50 $g/m^2$, greater than or equal to 60 $g/m^2$, greater than or equal to 70 $g/m^2$, greater than or equal to 80 $g/m^2$, greater than or equal to 90 $g/m^2$, greater than or equal to 100 $g/m^2$. greater than or equal to 110 $g/m^2$, greater than or equal to 120 $g/m^2$, greater than or equal to 130 $g/m^2$, greater than or equal to 140 $g/m^2$, greater than or equal to 150 $g/m^2$, greater than or equal to 160 $g/m^2$, greater than or equal to 170 $g/m^2$, greater than or equal to 180 $g/m^2$, greater than or equal to 190 $g/m^2$, greater than or equal to 200 $g/m^2$, greater than or equal to 225 $g/m^2$, greater than or equal to 250 $g/m^2$, greater than or equal to 275 $g/m^2$, greater than or equal to 300 $g/m^2$, greater than or equal to 325 $g/m^2$, greater than or equal to 350 $g/m^2$, greater than or equal to 375 $g/m^2$, or greater than or equal to 400 $g/m^2$. In some embodiments, the fiber web and/or separator has a basis weight of less than or equal to 600 $g/m^2$, less than or equal to 590 $g/m^2$, less than or equal to 580 $g/m^2$, less than or equal to 570 $g/m^2$, less than or equal to 560 $g/m^2$, less than or equal to 550 $g/m^2$, less than or equal to 525 $g/m^2$, less than or equal to 500 $g/m^2$, less than or equal to 475 $g/m^2$, less than or equal to 450 $g/m^2$, less than or equal to 425 $g/m^2$, less than or equal to 400 $g/m^2$, less than or equal to 375 $g/m^2$, less than or equal to 350 $g/m^2$, less than or equal to 325 $g/m^2$, less than or equal to 300 $g/m^2$, less than or equal to 275 $g/m^2$, less than or equal to 250 $g/m^2$, less than or equal to 225 $g/m^2$, less than or equal to 200 g/m$^2$, less than or equal to 175 g/m$^2$, less than or equal to 150 g/m$^2$, less than or equal to 125 g/m$^2$, less than or equal to 100 g/m$^2$. Combinations of the above-referenced ranges are also possible (e.g., greater than or equal to 20 g/m$^2$ and less than or equal to 600 g/m$^2$, greater than or equal to 100 g/m$^2$ and less than or equal to 400 g/m$^2$, or greater than or equal to 200 g/m$^2$ and less than or equal to 350 g/m$^2$). Other ranges are also possible. The basis weight of a fiber web and/or separator may be determined according to the standard ISO 536:2012.

The fiber web and/or separator may have a variety of suitable apparent densities. For example, in some embodiments, the fiber web and/or separator has an apparent density of greater than or equal to 100 gsm/mm, greater than or equal to 110 gsm/mm, greater than or equal to 120 gsm/mm, greater than or equal to 130 gsm/mm, greater than or equal to 140 gsm/mm, greater than or equal to 150 gsm/mm, greater than or equal to 160 gsm/mm, greater than or equal to 170 gsm/mm, greater than or equal to 180 gsm/mm, greater than or equal to 190 gsm/mm, or greater than or equal to 200 gsm/mm. In some embodiments, the fiber web and/or separator has an apparent density of less than or equal to 250 gsm/mm, less than or equal to 240 gsm/mm, less than or equal to 230 gsm/mm, less than or equal to 220 gsm/mm, less than or equal to 210 gsm/mm, less than or equal to 200 gsm/mm, less than or equal to 190 gsm/mm, less than or equal to 180 gsm/mm, less than or equal to 170 gsm/mm, less than or equal to 160 gsm/mm, or less than or equal to 150 gsm/mm. Combinations of the above-referenced ranges are also possible (e.g., greater than or equal to 100 gsm/mm and less than or equal to 250 gsm/mm, greater than or equal to 120 gsm/mm and less than or equal to 200 gsm/mm, or greater than or equal to 140 gsm/mm and less than or equal to 180 gsm/mm). Other ranges are also possible. The apparent density may be determined by dividing the basis weight by the thickness.

The fiber web and/or separator may have a variety of suitable BET specific surface areas. For example, in some embodiments, the fiber web and/or separator has a BET specific surface area of greater than or equal to 0.5 m$^2$/g, greater than or equal to 0.6 m$^2$/g, greater than or equal to 0.7 m$^2$/g, greater than or equal to 0.8 m$^2$/g, greater than or equal to 0.9 m$^2$/g, greater than or equal to 1.0 m$^2$/g, greater than or equal to 1.1 m$^2$/g, greater than or equal to 1.2 m$^2$/g, greater than or equal to 1.3 m$^2$/g, greater than or equal to 1.4 m$^2$/g, greater than or equal to 1.5 m$^2$/g, greater than or equal to 1.6 m$^2$/g, greater than or equal to 1.7 m$^2$/g, greater than or equal to 1.8 m$^2$/g, greater than or equal to 1.9 m$^2$/g, greater than or equal to 2.0 m$^2$/g, greater than or equal to 2.1 m$^2$/g, greater than or equal to 2.2 m$^2$/g, greater than or equal to 2.3 m$^2$/g, greater than or equal to 2.4 m$^2$/g, or greater than or equal to 2.5 m$^2$/g. In some embodiments, the fiber web and/or separator has a BET specific surface area of less than or equal to 4 m$^2$/g, less than or equal to 3.9 m$^2$/g, less than or equal to 3.8 m$^2$/g, less than or equal to 3.7 m$^2$/g, less than or equal to 3.6 m$^2$/g, less than or equal to 3.5 m$^2$/g, less than or equal to 3.4 m$^2$/g, less than or equal to 3.3 m$^2$/g, less than or equal to 3.2 m$^2$/g, less than or equal to 3.1 m$^2$/g, less than or equal to 3.0 m$^2$/g, less than or equal to 2.9 m$^2$/g, less than or equal to 2.8 m$^2$/g, less than or equal to 2.7 m$^2$/g, less than or equal to 2.6 m$^2$/g, less than or equal to 2.5 m$^2$/g, less than or equal to 2.4 m$^2$/g, less than or equal to 2.3 m$^2$/g, less than or equal to 2.2 m$^2$/g, less than or equal to 2.1 m$^2$/g, less than or equal to 2.0 m$^2$/g, less than or equal to 1.9 m$^2$/g, less than or equal to 1.8 m$^2$/g, less than or equal to 1.7 m$^2$/g. less than or equal to 1.6 m$^2$/g, or less than or equal to 1.5 m$^2$/g. Combinations of the above-referenced ranges are also possible (e.g., greater than or equal to 0.5 m$^2$/g and less than or equal to 4 m$^2$/g, greater than or equal to 1.2 m$^2$/g and less than or equal to 2.5 m$^2$/g, or greater than or equal to 1.6 m$^2$/g and less than or equal to 2.2 m$^2$/g). Other ranges are also possible. The specific surface area may be determined in accordance with section 10 of Battery Council International Standard BCIS-03A (2009), "Recommended Battery Materials Specifications Valve Regulated Recombinant Batteries", section 10 being "Standard Test Method for Surface Area of Recombinant Battery Separator Mat". Following this technique, the specific surface area is measured via adsorption analysis using a BET surface analyzer (e.g., Micromeritics Gemini III 2375 Surface Area Analyzer) with nitrogen gas; the sample amount is between 0.5 and 0.6 grams in a 3/4" tube; and, the sample is allowed to degas at 100° C. for a minimum of 3 hours.

The fiber web and/or separator may have a variety of suitable porosities. For example, in some embodiments, the porosity of the fiber web and/or separator is greater than or equal to 75%, greater than or equal to 77%, greater than or equal to 80%, greater than or equal to 82%, greater than or equal to 85%, greater than or equal to 87%, greater than or equal to 89%, greater than or equal to 90%, greater than or equal to 92%, or greater than or equal to 95%. In some embodiments, the porosity of the fiber web and/or separator is less than or equal to 98%, less than or equal to 97%, less than or equal to 96%, less than or equal to 95%, less than or equal to 94%, less than or equal to 93%, less than or equal to 92%, less than or equal to 91%, less than or equal to 90%, less than or equal to 88%, less than or equal to 85%, or less than or equal to 80%. Combinations of the above-referenced ranges are also possible (e.g., greater than or equal to 75% and less than or equal to 98%, greater than or equal to 85% and less than or equal to 95%, greater than or equal to 89% and less than or equal to 93%). Other ranges are also possible. The porosity of a fiber web (or separator) is equivalent to 100%-[solidity of the fiber web (or separator)]. The solidity of a fiber web (or separator) is equivalent to the percentage of the interior of the fiber web (or separator) occupied by solid material. One non-limiting way of determining solidity of a fiber web (or separator) is described in this paragraph, but other methods are also possible. The method described in this paragraph includes determining the basis weight and thickness of the fiber web (or separator) and then applying the following formula: solidity=[basis weight of the fiber web in gsm (or separator)/(10* density of the components forming the fiber web in g/cm$^3$ (or separator)* hickness of the fiber web in mm) (or separator)]*100%. The density of the components forming the fiber web (or separator) is equivalent to the average density of the material or material(s) forming the components of the fiber web (or separator) (e.g., fibers, particles, resin), which is typically specified by the manufacturer of each material. The average density of the materials forming the components of the fiber web (or separator) may be determined by: (1) determining the total volume of all of the components in the fiber web (or separator); and (2) dividing the total mass of all of the components in the fiber web (or separator) by the total volume of all of the components in the fiber web (or separator). If the mass and density of each component of the fiber web (or separator) are known, the volume of all the components in the fiber web (or separator) may be determined by: (1) for each type of component, dividing the total mass of the component in the fiber web (or separator) by the density of the component; and (2) summing the volumes of each component. If the mass and density of each component of the fiber web (or separator) are not known, the volume of all the components in the fiber web (or separator) may be determined in accordance with Archimedes' principle.

The fiber web and/or separator may have any suitable dry tensile strength in the machine direction. For example, in some embodiments, the fiber web and/or separator has a dry tensile strength in the machine direction of greater than or equal to 0.1 kN/m, greater than or equal to 0.2 kN/m, greater than or equal to 0.3 kN/m, greater than or equal to 0.4 kN/m, greater than or equal to 0.5 kN/m, greater than or equal to 0.6 kN/m, greater than or equal to 0.7 kN/m, greater than or equal to 0.8 kN/m. greater than or equal to 0.9 kN/m, greater than or equal to 1 kN/m. greater than or equal to 1.5 kN/m, greater than or equal to 2 kN/m, greater than or equal to 3 kN/m, greater than or equal to 4 kN/m, greater than or equal to 5 kN/m, greater than or equal to 6 kN/m, greater than or equal to 7 kN/m, greater than or equal to 8 kN/m, or greater than or equal to 9 kN/m. In some embodiments, the fiber web and/or separator has a dry tensile strength in the machine direction of less than or equal to 15 kN/m, less than or equal to 14 kN/m, less than or equal to 13 kN/m, less than or equal to 12 kN/m, less than or equal to 11 kN/m, less than or equal to 10 kN/m, less than or equal to 9 kN/m, less than or equal to 8 kN/m, less than or equal to 7 KN/m, less than or equal to 6 kN/m, less than or equal to 5 kN/m, less than or equal to 4 kN/m, less than or equal to 3 kN/m, less than or equal to 2 kN/m, or less than or equal to 1 kN/m. Combinations of the above-referenced ranges are also possible (e.g., greater than or equal to 0.1 kN/m and less than or equal to 15 kN/m, greater than or equal to 0.4 kN/m and less than or equal to 5 kN/m, or greater than or equal to 0.5 kN/m and less than or equal to 2 kN/m). Other ranges are also possible. Dry tensile strength in the machine direction may be measured according to BCIS-03A (2015).

The fiber web and/or separator may have any suitable dry tensile strength in the cross direction. For example, in some embodiments, the fiber web and/or separator has a dry tensile strength in the cross direction of greater than or equal to 0.1 kN/m, greater than or equal to 0.2 kN/m, greater than or equal to 0.3 kN/m. greater than or equal to 0.4 kN/m, greater than or equal to 0.5 kN/m, greater than or equal to 0.6 kN/m, greater than or equal to 0.7 kN/m, greater than or equal to 0.8 kN/m, greater than or equal to 0.9 kN/m, greater than or equal to 1 kN/m, greater than or equal to 1.5 kN/m, greater than or equal to 2 kN/m, greater than or equal to 3 kN/m, greater than or equal to 4 kN/m, greater than or equal to 5 kN/m, greater than or equal to 6 kN/m, greater than or equal to 7 kN/m, greater than or equal to 8 kN/m, or greater than or equal to 9 kN/m. In some embodiments, the fiber web and/or separator has a dry tensile strength in the cross direction of less than or equal to 15 kN/m, less than or equal to 14 kN/m, less than or equal to 13 kN/m, less than or equal to 12 kN/m, less than or equal to 11 kN/m, less than or equal to 10 KN/m, less than or equal to 9 kN/m, less than or equal to 8 kN/m, less than or equal to 7 kN/m, less than or equal to 6 kN/m, less than or equal to 5 kN/m, less than or equal to 4 kN/m, less than or equal to 3 kN/m, less than or equal to 2 kN/m, less than or equal to 1.5 kN/m, or less than or equal to 1 kN/m. Combinations of the above-referenced ranges are also possible (e.g., greater than or equal to 0.1 kN/m and less than or equal to 15 kN/m, greater than or equal to 0.4 kN/m and less than or equal to 5 kN/m, or greater than or equal to 0.3 kN/m and less than or equal to 1.5 kN/m). Other ranges are also possible. Dry tensile strength in the cross direction may be measured according to BCIS-03A (2015).

The fiber web and/or separator may have any suitable wet tensile strength in the machine direction. For example, in some embodiments, the fiber web and/or separator has a wet tensile strength in the machine direction of greater than or equal to 0.1 kN/m, greater than or equal to 0.2 kN/m. greater than or equal to 0.3 kN/m, greater than or equal to 0.4 kN/m, greater than or equal to 0.5 kN/m, greater than or equal to 0.6 kN/m. greater than or equal to 0.7 kN/m, greater than or equal to 0.8 kN/m, greater than or equal to 0.9 kN/m, greater than or equal to 1 kN/m, greater than or equal to 1.5 kN/m, greater than or equal to 2 kN/m, greater than or equal to 3 kN/m, greater than or equal to 4 kN/m, greater than or equal to 5 kN/m, greater than or equal to 6 kN/m, greater than or equal to 7 kN/m, greater than or equal to 8 kN/m, or greater than or equal to 9 kN/m. In some embodiments, the fiber web and/or separator has a wet tensile strength in the machine direction of less than or equal to 15 kN/m, less than or equal to 14 kN/m, less than or equal to 13 kN/m, less than or equal to 12 kN/m, less than or equal to 11 kN/m, less than or equal to 10 KN/m, less than or equal to 9 kN/m, less than or equal to 8 kN/m, less than or equal to 7 KN/m, less than or equal to 6 kN/m, less than or equal to 5 kN/m, less than or equal to 4 kN/m, less than or equal to 3 kN/m, less than or equal to 2 kN/m, or less than or equal to 1 kN/m. Combinations of the above-referenced ranges are also possible (e.g., greater than or equal to 0.1 kN/m and less than or equal to 15 kN/m, greater than or equal to 0.3 kN/m and less than or equal to 4 kN/m, or greater than or equal to 0.4 kN/m and less than or equal to 2 kN/m). Other ranges are also possible. Wet tensile strength in the machine direction may be measured according to BCIS-03A (2015) but with a 1-minute full immersion of the sample in DI water before testing the tensile strength.

The fiber web and/or separator may have any suitable elongation at break in the machine direction and/or cross direction. For example, in some embodiments, the fiber web and/or separator has an elongation at break in the machine direction and/or cross direction of greater than or equal to 0.5%, greater than or equal to 0.6%, greater than or equal to 0.7%, greater than or equal to 0.8%, greater than or equal to 0.9%, greater than or equal to 1%, greater than or equal to 1.25%, greater than or equal to 1.5%, greater than or equal to 1.75%, greater than or equal to 2%, greater than or equal to 3%, greater than or equal to 4%, greater than or equal to 5%, greater than or equal to 6%, greater than or equal to 7%, greater than or equal to 8%, greater than or equal to 9%, greater than or equal to 10%, greater than or equal to 11%, greater than or equal to 12%, greater than or equal to 13%, greater than or equal to 14%, or greater than or equal to 15%. In some embodiments, the fiber web and/or separator has an elongation at break in the machine direction and/or cross direction of less than or equal to 20%, less than or equal to 19%, less than or equal to 18%, less than or equal to 17%, less than or equal to 16%, less than or equal to 15%, less than or equal to 14%, less than or equal to 13%, less than or equal to 12%, less than or equal to 11%, less than or equal to 10%, less than or equal to 9%, less than or equal to 8%, less than or equal to 7%, less than or equal to 6%, less than or equal to 5%, less than or equal to 4%, or less than or equal to 3%. Combinations of the above-referenced ranges are also possible (e.g., greater than or equal to 0.5% and less than or equal to 20%, greater than or equal to 1% and less than or equal to 12%, or greater than or equal to 2% and less than or equal to 6%). Other ranges are also possible. Elongation at break may be measured according to BCIS-03A (2015).

The fiber web and/or separator may have any suitable loss of ignition. For example, in some embodiments, the fiber web and/or separator has a loss of ignition of greater than or equal to 0%, greater than or equal to 1%, greater than or equal to 2%, greater than or equal to 3%, greater than or equal to 4%, greater than or equal to 5%, greater than or equal to 6%, greater than or equal to 7%, greater than or equal to 8%, greater than or equal to 9%, greater than or equal to 10%, greater than or equal to 15%, greater than or equal to 20%, greater than or equal to 25%, greater than or equal to 30%, or greater than or equal to 35%. In some embodiments, the fiber web and/or separator has a loss of ignition of less than or equal to 40%, less than or equal to 35%, less than or equal to 30%, less than or equal to 25%, less than or equal to 20%, less than or equal to 15%, less than or equal to 10%, less than or equal to 9%, less than or equal to 8%, less than or equal to 7%, less than or equal to 6%, less than or equal to 5%, less than or equal to 4%, less than or equal to 3%, less than or equal to 2%, or less than or equal to 1%. Combinations of the above-referenced ranges are also possible (e.g., greater than or equal to 0% and less than or equal to 40%, greater than or equal to 0% and less than or equal to 15%, or greater than or equal to 0% and less than or equal to 10%). Other ranges are also possible. Loss of ignition may be measured according to BCIS-03A (2015).

The fiber web and/or separator may have any suitable air resistance. For example, in some embodiments, the fiber web and/or separator has an air resistance of greater than or equal to 1 mm $H_2O$, greater than or equal to 2 mm $H_2O$, greater than or equal to 3 mm $H_2O$, greater than or equal to 4 mm $H_2O$, greater than or equal to 5 mm $H_2O$, greater than or equal to 10 mm $H_2O$, greater than or equal to 15 mm $H_2O$, greater than or equal to 20 mm $H_2O$, greater than or equal to 30 mm $H_2O$, greater than or equal to 40 mm $H_2O$, greater than or equal to 50 mm $H_2O$, greater than or equal to 60 mm $H_2O$, greater than or equal to 70 mm $H_2O$, greater than or equal to 80 mm $H_2O$, greater than or equal to 90 mm $H_2O$, greater than or equal to 100 mm $H_2O$, greater than or equal to 125 mm $H_2O$, greater than or equal to 150 mm $H_2O$, greater than or equal to 175 mm $H_2O$, greater than or equal to 200 mm $H_2O$, greater than or equal to 250 mm $H_2O$, greater than or equal to 300 mm $H_2O$, greater than or equal to 350 mm $H_2O$, greater than or equal to 400 mm $H_2O$, or greater than or equal to 450 mm $H_2O$. In some embodiments, the fiber web and/or separator has an air resistance of less than or equal to 500 mm $H_2O$, less than or equal to 475 mm $H_2O$, less than or equal to 450 mm $H_2O$, less than or equal to 425 mm $H_2O$, less than or equal to 400 mm $H_2O$, less than or equal to 375 mm $H_2O$, less than or equal to 350 mm $H_2O$, less than or equal to 325 mm $H_2O$, less than or equal to 300 mm $H_2O$, less than or equal to 275 mm $H_2O$, less than or equal to 250 mm $H_2O$, less than or equal to 225 mm $H_2O$, less than or equal to 200 mm $H_2O$, less than or equal to 175 mm $H_2O$, less than or equal to 150 mm $H_2O$, less than or equal to 125 mm $H_2O$, less than or equal to 100 mm $H_2O$, less than or equal to 75 mm $H_2O$, less than or equal to 50 mm $H_2O$, less than or equal to 25 mm $H_2O$, or less than or equal to 10 mm $H_2O$. Combinations of the above-referenced ranges are also possible (e.g., greater than or equal to 1 mm $H_2O$ and less than or equal to 500 mm $H_2O$, greater than or equal to 10 mm $H_2O$ and less than or equal to 300 mm $H_2O$, or greater than or equal to 50 mm $H_2O$ and less than or equal to 150 mm $H_2O$). Other ranges are also possible. The air resistance may be measured as the air pressure drop in in mm$H_2O$ across the sample at face air velocity of 5.33 cm/s with 100 $cm^2$ round test area at 1.013 bar atmospheric pressure and room temperature.

The fiber web and/or separator may have any suitable wicking height in acid in the machine direction. For example, in some embodiments, the fiber web and/or separator has a wicking height in acid in the machine direction when measured at 2 minutes of greater than or equal to 5 mm, greater than or equal to 10 mm, greater than or equal to 15 mm, greater than or equal to 20 mm, greater than or equal to 25 mm, greater than or equal to 30 mm, greater than or equal to 35 mm, greater than or equal to 40 mm, greater than or equal to 45 mm, greater than or equal to 50 mm, greater than or equal to 75 mm, greater than or equal to 100 mm, greater than or equal to 125 mm, greater than or equal to 150 mm, or greater than or equal to 175 mm. In some embodiments, the fiber web and/or separator has a wicking height in acid in the machine direction when measured at 2 minutes of less than or equal to 200 mm, less than or equal to 17 5 mm, less than or equal to 150 mm, less than or equal to 125 mm, less than or equal to 100 mm, less than or equal to 90 mm, less than or equal to 80 mm, less than or equal to 70 mm, less than or equal to 60 mm, less than or equal to 50 mm, less than or equal to 40 mm, less than or equal to 30 mm, less than or equal to 20 mm, or less than or equal to 10 mm. Combinations of the above-referenced ranges are also possible (e.g., greater than or equal to 5 mm and less than or equal to 200 mm, greater than or equal to 20 mm and less than or equal to 100 mm, or greater than or equal to 40 mm and less than or equal to 80 mm). Other ranges are also possible. Wicking height may be measured according to BCIS-03A (2015).

As another example, in some embodiments, the fiber web and/or separator has a wicking height in acid in the machine direction when measured at 5 minutes of greater than or equal to 10 mm, greater than or equal to 15 mm, greater than or equal to 20 mm, greater than or equal to 25 mm, greater than or equal to 30 mm, greater than or equal to 35 mm, greater than or equal to 40 mm, greater than or equal to 45 mm, greater than or equal to 50 mm, greater than or equal to 55 mm, greater than or equal to 60 mm, greater than or equal to 75 mm, greater than or equal to 100 mm, greater than or equal to 125 mm, greater than or equal to 150 mm, or greater than or equal to 175 mm. In some embodiments, the fiber web and/or separator has a wicking height in acid in the machine direction when measured at 5 minutes of less than or equal to 500 mm, less than or equal to 475 mm, less than or equal to 450 mm, less than or equal to 425 mm, less than or equal to 400 mm, less than or equal to 375 mm, less than or equal to 350 mm, less than or equal to 325 mm, less than or equal to 300 mm, less than or equal to 275 mm, less than or equal to 250 mm, less than or equal to 225 mm, less than or equal to 200 mm, less than or equal to 175 mm, less than or equal to 150 mm, less than or equal to 125 mm, less than or equal to 100 mm, less than or equal to 90 mm, less than or equal to 80 mm, less than or equal to 70 mm, less than or equal to 60 mm, less than or equal to 50 mm, less than or equal to 40 mm, less than or equal to 30 mm, less than or equal to 20 mm, or less than or equal to 10 mm. Combinations of the above-referenced ranges are also possible (e.g., greater than or equal to 10 mm and less than or equal to 500 mm, greater than or equal to 30 mm and less than or equal to 250 mm, or greater than or equal to 60 mm and less than or equal to 150 mm). Other ranges are also possible. Wicking height may be measured according to BCIS-03A (2015).

The fiber web and/or separator may have any suitable moisture content. For example, in some embodiments, the fiber web and/or separator has a moisture content of greater than or equal to 0%, greater than or equal to 0.1%, greater than or equal to 0.2%, greater than or equal to 0.3%, greater than or equal to 0.4%, greater than or equal to 0.5%, greater than or equal to 0.6%, greater than or equal to 0.7%, greater than or equal to 0.8%, greater than or equal to 0.9%, greater than or equal to 1%, greater than or equal to 1.25%, greater than or equal to 1.5%, greater than or equal to 1.75%, greater than or equal to 2%, greater than or equal to 3%, greater than or equal to 4%, greater than or equal to 5%, greater than or equal to 6%, greater than or equal to 7%, greater than or equal to 8%, or greater than or equal to 9%. In some embodiments, the fiber web and/or separator has a moisture content of less than or equal to 10%, less than or equal to 9.5%, less than or equal to 9%, less than or equal to 8.5%, less than or equal to 8%, less than or equal to 7.5%, less than or equal to 7%, less than or equal to 6.5%, less than or equal to 6%, less than or equal to 5.5%, less than or equal to 5%, less than or equal to 4.5%, less than or equal to 4%, less than or equal to 3.5%, less than or equal to 3%, less than or equal to 2.5%, less than or equal to 2%, less than or equal to 1.5%, less than or equal to 1%, less than or equal to 0.75%, or less than or equal to 0.5%. Combinations of the above-referenced ranges are also possible (e.g., greater than or equal to 0% and less than or equal to 10%, greater than or equal to 0% and less than or equal to 1%, or greater than or equal to 0% and less than or equal to 0.5%). Other ranges are also possible. The moisture content may be measured according to BCIS-03A (2015).

The fiber web and/or separator may have any suitable maximum pore size. For example, in some embodiments, the fiber web and/or separator has a maximum pore size of greater than or equal to 1 micron, greater than or equal to 2 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 12 microns, greater than or equal to 15 microns, greater than or equal to 20 microns, greater than or equal to 25 microns, greater than or equal to 30 microns, greater than or equal to 35 microns, greater than or equal to 40 microns, greater than or equal to 50 microns, greater than or equal to 60 microns, or greater than or equal to 70 microns. In some embodiments, the fiber web and/or separator has a maximum pore size of less than or equal to 80 microns, less than or equal to 75 microns, less than or equal to 70 microns, less than or equal to 65 microns, less than or equal to 60 microns, less than or equal to 55 microns, less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, or less than or equal to 5 microns. Combinations of the above-referenced ranges are also possible (e.g., greater than or equal to 1 micron and less than or equal to 80 microns, greater than or equal to 5 microns and less than or equal to 40 microns, or greater than or equal to 10 microns and less than or equal to 20 microns). Other ranges are also possible. Maximum pore size may be determined by using a Capillary Flow Porometer manufactured by Porous Materials, Inc. in accordance with the ASTM F316-03 standard.

The fiber web and/or separator may have any suitable mean pore size. For example, in some embodiments, the fiber web and/or separator has a mean pore size of greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 1.25 microns, greater than or equal to 1.5 microns, greater than or equal to 1.75 microns, greater than or equal to 2 microns, greater than or equal to 2.5 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 15 microns, greater than or equal to 20 microns, greater than or equal to 30 microns, or greater than or equal to 40 microns. In some embodiments, the fiber web and/or separator has a mean pore size of less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, or less than or equal to 2 microns. Combinations of the above-referenced ranges are also possible (e.g., greater than or equal to 0.5 microns and less than or equal to 50 microns, greater than or equal to 1 micron and less than or equal to 20 microns, or greater than or equal to 2 microns and less than or equal to 6 microns). Other ranges are also possible. Mean pore size may be determined by using a Capillary Flow Porometer manufactured by Porous Materials, Inc. in accordance with the ASTM F316-03 standard.

The fiber web and/or separator may have any suitable minimum pore size. For example, in some embodiments, the fiber web and/or separator has a minimum pore size of greater than or equal to 0.01 microns, greater than or equal to 0.05 microns, greater than or equal to 0.1 microns, greater than or equal to 0.2 microns, greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 1.25 microns, greater than or equal to 1.5 microns, greater than or equal to 1.75 microns, greater than or equal to 2 microns, greater than or equal to 2.5 microns, greater than or equal to 3 microns, greater than or equal to 4 microns, greater than or equal to 5 microns, greater than or equal to 6 microns, greater than or equal to 7 microns, greater than or equal to 8 microns, or greater than or equal to 9 microns. In some embodiments, the fiber web and/or separator has a minimum pore size of less than or equal to 10 microns, less than or equal to 9.5 microns, less than or equal to 9 microns, less than or equal to 8.5 microns, less than or equal to 8 microns, less than or equal to 7.5 microns, less than or equal to 7 microns, less than or equal to 6.5 microns, less than or equal to 6 microns, less than or equal to 5.5 microns, less than or equal to 5 microns, less than or equal to 4.5 microns, less than or equal to 4 microns, less than or equal to 3.5 microns, less than or equal to 3 microns, less than or equal to 2.5 microns, less than or equal to 2 microns, less than or equal to 1.5 microns, less than or equal to 1 micron, or less than or equal to 0.5 microns. Combinations of the above-referenced ranges are also possible (e.g., greater than or equal to 0.01 microns and less than or equal to 10 microns, greater than or equal to 0.2 microns and less than or equal to 3 microns, or greater than or equal to 0.3 microns and less than or equal to 2 microns). Other ranges are also possible. Minimum pore size may be determined by using a Capillary Flow Porometer manufactured by Porous Materials, Inc.

The fiber web and/or separator may have any suitable puncture strength. For example, in some embodiments, the fiber web and/or separator has a puncture strength of greater than or equal to 50 g, greater than or equal to 100 g, greater than or equal to 150 g, greater than or equal to 200 g, greater than or equal to 250 g, greater than or equal to 300 g, greater than or equal to 350 g, greater than or equal to 400 g, greater than or equal to 450 g, greater than or equal to 500 g, greater than or equal to 600 g, greater than or equal to 700 g, greater than or equal to 800 g, greater than or equal to 900 g, greater than or equal to 1,000 g, greater than or equal to 1,250 g, greater than or equal to 1,500 g, greater than or equal to 1,750 g, greater than or equal to 2,000 g, greater than or equal to 2,500 g, greater than or equal to 3,000 g, greater than or equal to 4,000 g, greater than or equal to 5,000 g, greater than or equal to 6,000 g, greater than or equal to 7,000 g, greater than or equal to 8,000 g, greater than or equal to 9,000 g, greater than or equal to 10,000 g, greater than or equal to 11,000 g, greater than or equal to 12,000 g, greater than or equal to 13,000 g, greater than or equal to 14,000 g, greater than or equal to 15,000 g, greater than or equal to 16,000 g, greater than or equal to 17,000 g, greater than or equal to 18,000 g, or greater than or equal to 19,000 g. In some embodiments, the fiber web and/or separator has a puncture strength of less than or equal to 20,000 g, less than or equal to 19,000 g, less than or equal to 18,000 g, less than or equal to 17,000 g, less than or equal to 16,000 g, less than or equal to 15,000 g, less than or equal to 14,000 g, less than or equal to 13,000 g, less than or equal to 12,000 g, less than or equal to 11,000 g, less than or equal to 10,000 g, less than or equal to 9,000 g, less than or equal to 8,000 g, less than or equal to 7,000 g, less than or equal to 6,000 g, less than or equal to 5,000 g, less than or equal to 4,000 g, less than or equal to 3,000 g, less than or equal to 2,000 g, less than or equal to 1,000 g, less than or equal to 900 g, less than or equal to 800 g, less than or equal to 700 g, less than or equal to 600 g, or less than or equal to 500 g. Combinations of the above-referenced ranges are also possible (e.g., greater than or equal to 50 g and less than or equal to 20,000 g, greater than or equal to 250 g and less than or equal to 10,000 g, or greater than or equal to 500 g and less than or equal to 2,000 g). Other ranges are also possible. Puncture strength may be measured according to BCIS-03B (2018).

The fiber web and/or separator may have any suitable electrical resistance. For example, in some embodiments, the fiber web and/or separator has an electrical resistance of greater than or equal to 2 mohms·cm$^2$, greater than or equal to 3 mohms·cm$^2$, greater than or equal to 4 mohms·cm$^2$, greater than or equal to 5 mohms·cm$^2$, greater than or equal to 10 mohms·cm$^2$, greater than or equal to 15 mohms·cm$^2$, greater than or equal to 20 mohms·cm$^2$, greater than or equal to 25 mohms·cm$^2$, greater than or equal to 30 mohms·cm$^2$, greater than or equal to 40 mohms·cm$^2$, greater than or equal to 50 mohms·cm$^2$, greater than or equal to 75 mohms·cm$^2$, greater than or equal to 100 mohms·cm$^2$, greater than or equal to 125 mohms·cm$^2$, greater than or equal to 150 mohms·cm$^2$, greater than or equal to 175 mohms·cm$^2$, greater than or equal to 200 mohms·cm$^2$, greater than or equal to 250 mohms·cm$^2$, greater than or equal to 300 mohms·cm$^2$, greater than or equal to 400 mohms·cm$^2$, greater than or equal to 500 mohms·cm$^2$, greater than or equal to 600 mohms·cm$^2$, greater than or equal to 700 mohms·cm$^2$, greater than or equal to 800 mohms·cm$^2$, or greater than or equal to 900 mohms·cm$^2$. In some embodiments, the fiber web and/or separator has an electrical resistance of less than or equal to 1,000 mohms·cm$^2$, less than or equal to 950 mohms·cm$^2$, less than or equal to 900 mohms·cm$^2$, less than or equal to 850 mohms·cm$^2$, less than or equal to 800 mohms·cm$^2$, less than or equal to 750 mohms·cm$^2$, less than or equal to 700 mohms·cm$^2$, less than or equal to 650 mohms·cm$^2$, less than or equal to 600 mohms·cm$^2$, less than or equal to 550 mohms·cm$^2$, less than or equal to 500 mohms·cm$^2$, less than or equal to 450 mohms·cm$^2$, less than or equal to 400 mohms·cm$^2$, less than or equal to 350 mohms·cm$^2$, less than or equal to 300 mohms·cm$^2$, less than or equal to 250 mohms·cm$^2$, less than or equal to 200 mohms·cm$^2$, less than or equal to 150 mohms·cm$^2$, less than or equal to 100 mohms·cm$^2$, less than or equal to 75 mohms·cm$^2$, less than or equal to 50 mohms·cm$^2$, less than or equal to 40 mohms·cm$^2$, less than or equal to 30 mohms·cm$^2$, or less than or equal to 20 mohms·cm$^2$. Combinations of the above-referenced ranges are also possible (e.g., greater than or equal to 2 mohms·cm$^2$ and less than or equal to 1.000 mohms·cm$^2$, greater than or equal to 20 mohms·cm$^2$ and less than or equal to 200 mohms·cm$^2$, or greater than or equal to 50 mohms·cm$^2$ and less than or equal to 150 mohms·cm$^2$). Other ranges are also possible. Electrical resistance may be measured according to BCIS-03A (2015).

The fiber web and/or separator may have any suitable recovery after compression. For example, in some embodiments, the fiber web and/or separator has a recovery after compression of greater than or equal to 80%, greater than or equal to 82%, greater than or equal to 84%, greater than or equal to 86%, greater than or equal to 88%, greater than or equal to 90%, greater than or equal to 92%, greater than or equal to 94%, greater than or equal to 96%, greater than or equal to 98%, or greater than or equal to 99%. In some embodiments, the fiber web and/or separator has a recovery after compression is less than or equal to 100%, less than or equal to 99%, less than or equal to 98%, less than or equal to 97%, less than or equal to 96%, less than or equal to 95%, less than or equal to 93%, less than or equal to 90%, less than or equal to 88%, less than or equal to 85%, or less than or equal to 83%. Combinations of the above-referenced ranges are also possible (e.g., greater than or equal to 80% and less than or equal to 100%, greater than or equal to 90% and less than or equal to 99%, or greater than or equal to 90% and less than or equal to 98%). Other ranges are also possible. Recovery after compression may be determined according to the following equation: [100%−% loss of thickness at 20 kPa], wherein % loss of thickness at 20 kPa is measured as follows: thickness is measured after 20 kPa of pressure is applied for 30 seconds, the pressure is relaxed for 30 seconds and then 50 kPa of pressure is applied for 30 seconds in the same location, then the pressure is relaxed for 30 seconds, 20 kPa of pressure is applied again on the same spot and the thickness is measured after 30 seconds at this 20 kPa. The % loss of thickness between the first and second thickness measurements at 20 kPa is calculated. Thickness may be measured according to BCIS-03A (2015).

Figure 2:
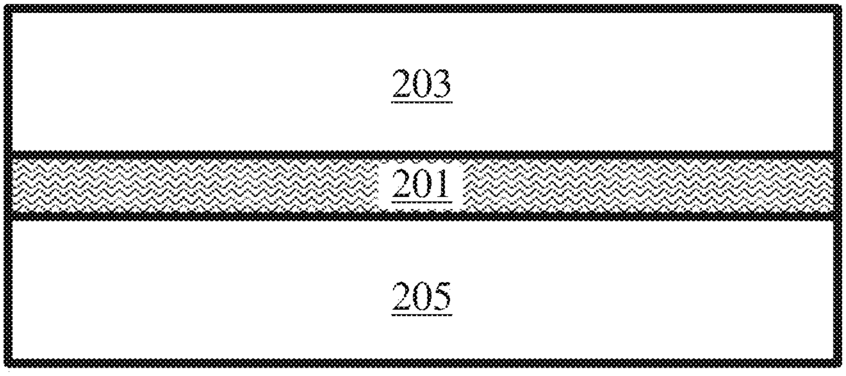
FIG. 2 shows a side-view schematic of a fiber web positioned between a first electrochemical cell and a second electrochemical cell, in accordance with some embodiments.

In some embodiments, a battery comprises a fiber web (e.g., any combinations of embodiments for a fiber web disclosed herein). As an example, a fiber web may be positioned between two electrochemical cells present in a battery. FIG. 2 presents a nonlimiting side-view schematic of a fiber web 201 positioned between a first electrochemical cell 203 and a second electrochemical cell 205. The fiber web 201 may directly contact at least a portion of the first electrochemical cell 203 and/or the second electrochemical cell 205, as shown in FIG. 2, or may be separated from one or both of the electrochemical cells 203 and 205 by one or more intervening materials (not shown). In some embodiments, a battery comprises a separator (e.g., any embodiments or combinations thereof disclosed herein for a separator), such as a separator comprising a fiber web (e.g., any combinations of embodiments for fiber web disclosed herein).

In some embodiments, the battery separator comprises multiple fiber webs (e.g., greater than or equal to 1, greater than or equal to 2, or greater than or equal to 3; less than or equal to 5, less than or equal to 4, or less than or equal to 3; or combinations of these ranges, such as greater than or equal to 1 and less than or equal to 5 or greater than or equal to 1 and less than or equal to 3). In some such embodiments, one or more (e.g., all) of the fiber webs are the same. In some embodiments, one or more (e.g., all) of the fiber webs are different. In some such cases, while one or more (e.g., all) of the fiber webs are different, they may each have any embodiment or combination of embodiments for fiber webs disclosed herein.

The battery separators described herein may be produced in processes such that the separator is formed and wound around a roll (e.g., in a continuous process). In such embodiments, the "machine direction" of the separator refers to the direction in the separator along which it is wound around the roll. During fabrication of the battery separator, tensile force may be applied to the separator in this direction to wind it around the roll. The "cross direction" of the separator refers to the direction perpendicular to the machine direction.

In some embodiments, a battery separator described herein may be suitable for use in a battery and/or a battery comprising a battery separator described herein may be provided. By way of example, in some embodiments, a battery separator described herein may be suitable for use in a lead-acid battery and/or the embodiment may relate to a lead-acid battery comprising a separator described herein. Lead-acid batteries typically comprise a first battery plate (e.g., a negative battery plate) that comprises lead and a second battery plate (e.g., a positive battery plate) that comprises lead dioxide. During discharge, electrons pass from the first battery plate to the second battery plate while the lead paste in the first battery plate is oxidized to form lead sulfate and the lead dioxide in the second battery plate is reduced to also form lead sulfate. During charge, electrons pass from the second battery plate to the first battery plate while the lead sulfate in the first battery plate is reduced to form lead and the lead sulfate in the second battery plate is oxidized to form lead dioxide.

In some embodiments, a separator as described herein may be configured for use in a valve regulated lead-acid battery (VRLA) battery, such as an AGM/VRLA battery (and/or may be present in a VRLA battery such as an AGM/VRLA battery). VRLA batteries are lead-acid batteries that comprise a valve configured to vent one or more gases from the battery. These gases may include gases that form as a result of electrolyte decomposition during overcharging, such as hydrogen gas and/or oxygen gas. It may be desirable to maintain the gases in the battery so that they may recombine, reducing or eliminating the need to replenish the decomposed electrolyte. However, it may also be desirable to maintain the pressure inside the battery at a safe level. For these reasons, the valve may be configured to vent the gas(es) under some circumstances, such as when the pressure inside the battery is above a threshold value, but not in others, such as when the pressure inside the battery is below the threshold value.

When the battery separators described herein are assembled, with further components, to form a final battery, the battery may compress the battery separator. This compression may cause the battery separator to have a thickness that is less than the thickness it had prior to incorporation into the battery and/or the thickness it would have if free standing (i.e., uncompressed).

Battery plates present in the batteries described herein typically comprise a battery paste disposed on a grid. A battery paste included in a first battery plate (e.g., a negative battery plate) may comprise lead, and/or may comprise both lead and lead dioxide (e.g., prior to full charging, during fabrication, during battery assembly, and/or during one or more portions of a method described herein). A battery paste included in a second battery plate (e.g., a positive battery plate), may comprise lead dioxide, and/or may comprise both lead and lead dioxide (e.g., prior to full charging, during fabrication, during battery assembly, and/or during one or more portions of a method described herein). Grids, in some embodiments, include lead and/or a lead alloy.

In some embodiments, one or more battery plates may further comprise one or more additional components. For instance, a battery plate may comprise a reinforcing material, such as an expander. When present, an expander may comprise barium sulfate, carbon black and lignin sulfonate as the primary components. The components of the expander(s) (e.g., carbon black and/or lignin sulfonate, if present, and/or any other components) can be pre-mixed or not pre-mixed. In some embodiments, a battery plate may comprise a commercially available expander, such as an expander produced by Hammond Lead Products (Hammond, IN) (e.g., a Texex® expander) or an expander produced by Atomized Products Group, Inc. (Garland, TX). Further examples of reinforcing materials include chopped organic fibers (e.g., having an average length of 0.125 inch or more), chopped glass fibers, metal sulfate(s) (e.g., nickel sulfate, copper sulfate), red lead (e.g., a Pb304-containing material), litharge, and paraffin oil.

It should be understood that while the additional components described above may be present in any combination of battery plates in a battery, some additional components may be especially advantageous for some types of battery plates. For instance, expanders, metal sulfates, and paraffins may be especially advantageous for use in second or positive battery plates. One or more of these components may be present in a second or positive battery plate, and absent in a first or negative battery plate. Some additional components described above may have utility in many types of battery plates (e.g., first battery plates, negative battery plates, second battery plates, positive battery plates). Non-limiting examples of such components include fibers (e.g., chopped organic fibers, chopped glass fibers). These components may, in some embodiments, be present in both first and second battery plates, and/or be present in both negative and positive battery plates.

Some embodiments relate to pasting papers. In some embodiments, the pasting paper comprises a fiber web (e.g., any embodiment or combination of embodiments for fiber webs disclosed herein) and/or fibers (e.g., any embodiment or combination of embodiments for fine glass fibers disclosed herein, any embodiment or combination of embodiments for coarse glass fibers disclosed herein, and/or any embodiment or combination of embodiments for strengthening fibers disclosed herein).

In some embodiments, the fiber web and/or pasting paper comprises a binder resin. In embodiments where the fiber web and/or pasting paper comprises a binder resin, the fiber web and/or pasting paper may have a variety of suitable amounts thereof. For example, in some embodiments, the fiber web and/or pasting paper comprises less than or equal to 10 wt %, less than or equal to 7 wt %, less than or equal to 5 wt %, less than or equal to 3 wt %, less than or equal to 2 wt %, less than or equal to 1 wt %, less than or equal to 0.5 wt %, or less than or equal to 0.2 wt % of the binder resin. In some embodiments, the fiber web and/or pasting paper comprises greater than or equal to 0.1 wt %, greater than or equal to 0.2 wt %, greater than or equal to 0.5 wt %, greater than or equal to 1 wt %, greater than or equal to 2 wt %, or greater than or equal to 5 wt % of the binder resin. Combinations of the above-referenced ranges are also possible (e.g., greater than or equal to 0.1 wt % and less than or equal to 10 wt %, greater than or equal to 0.5 wt % and less than or equal to 5 wt %, or greater than or equal to 1 wt % and less than or equal to 2 wt %). In some embodiments, the fiber web and/or the pasting paper includes 0 wt % binder resin. Other ranges are also possible.

When present, the binder resin may comprise a variety of suitable materials. In some embodiments, a binder resin may comprise a polymer, such as a synthetic polymer and/or a natural polymer. Non-limiting examples of suitable synthetic polymers include fluoropolymers (e.g., poly(tetrafluoroethylene), poly(vinylidene difluoride)), styrene-butadiene, and acrylic polymers (e.g., poly(acrylic acid), poly(acrylate esters)).

When present, the binder resin may be applied to the fiber web in a variety of suitable manners. For instance, the binder resin may be applied to the fiber web when present in a solution or in a suspension (e.g., for latex binders). The solution or suspension may further comprise water and/or an organic solvent.

Figure 3:
FIG. 3 shows a side-view schematic depiction of a pasting paper, in accordance with some embodiments.

FIG. 3 shows one non-limiting example of a pasting paper 100. Some articles and methods relate to pasting papers, such as that shown in FIG. 3; some articles and methods relate to the use of pasting papers, such as that shown in FIG. 3, in batteries, such as lead-acid batteries. For instance, pasting papers as described herein may be employed during the formation of battery plates (e.g., lead battery plates for lead-acid batteries, lead dioxide plates for lead-acid batteries). Certain articles described herein may comprise pasting papers disposed on battery plates; certain methods may comprise forming such articles by disposing pasting papers on battery pastes.

The pasting paper may have a variety of suitable thicknesses. For example, in some embodiments, the pasting paper has a thickness of greater than or equal to 0.05 mm, greater than or equal to 0.075 mm, greater than or equal to 0.1 mm, greater than or equal to 0.125 mm, greater than or equal to 0.15 mm, greater than or equal to 0.175 mm, greater than or equal to 0.2 mm, greater than or equal to 0.225 mm, greater than or equal to 0.25 mm, greater than or equal to 0.3 mm, greater than or equal to 0.35 mm, or greater than or equal to 0.4 mm. In some embodiments, the pasting paper has a thickness of less than or equal to 0.5 mm, less than or equal to 0.45 mm, less than or equal to 0.4 mm, less than or equal to 0.35 mm, less than or equal to 0.3 mm, less than or equal to 0.25 mm, less than or equal to 0.2 mm, less than or equal to 0.15 mm, or less than or equal to 0.1 mm. Combinations of the above-referenced ranges are also possible (e.g., greater than or equal to 0.05 mm and less than or equal to 0.5 mm, greater than or equal to 0.1 mm and less than or equal to 0.5 mm, greater than or equal to 0.1 mm and less than or equal to 0.3 mm, or greater than or equal to 0.15 mm and less than or equal to 0.25 mm). Other ranges are also possible. The thickness may be measured in accordance with BCIS-03A (2015) under 10 kPa applied pressure.

The pasting paper may have a variety of suitable basis weights. For example, in some embodiments, the pasting paper has a basis weight of greater than or equal to 5 $g/m^2$, greater than or equal to 10 $g/m^2$, greater than or equal to 15 $g/m^2$, greater than or equal to 20 $g/m^2$, greater than or equal to 25 $g/m^2$, greater than or equal to 30 $g/m^2$, greater than or equal to 35 $g/m^2$. greater than or equal to 40 $g/m^2$, greater than or equal to 45 $g/m^2$, greater than or equal to 50 $g/m^2$, greater than or equal to 60 $g/m^2$, greater than or equal to 70 $g/m^2$, greater than or equal to 80 $g/m^2$, or greater than or equal to 90 $g/m^2$. In some embodiments, the pasting paper has a basis weight of less than or equal to 100 $g/m^2$, less than or equal to 90 $g/m^2$, less than or equal to 80 $g/m^2$, less than or equal to 70 $g/m^2$, less than or equal to 60 $g/m^2$, less than or equal to 50 $g/m^2$. less than or equal to 45 $g/m^2$, less than or equal to 40 $g/m^2$, less than or equal to 35 $g/m^2$, less than or equal to 30 $g/m^2$, less than or equal to 25 $g/m^2$, less than or equal to 20 $g/m^2$, less than or equal to 15 $g/m^2$, or less than or equal to 10 $g/m^2$. Combinations of the above-referenced ranges are also possible (e.g., greater than or equal to 5 $g/m^2$ and less than or equal to 100 $g/m^2$, greater than or equal to 10 $g/m^2$ and less than or equal to 50 $g/m^2$, or greater than or equal to 20 $g/m^2$ and less than or equal to 40 $g/m^2$). Other ranges are also possible. The basis weight may be determined in accordance with BCIS-03A (2015).

The pasting paper may have a variety of suitable mean pore sizes. For example, in some embodiments, the pasting paper has a mean pore size of greater than or equal to 2 microns, greater than or equal to 3 microns, greater than or equal to 4 microns, greater than or equal to 5 microns, greater than or equal to 10 microns, greater than or equal to 15 microns, greater than or equal to 20 microns, greater than or equal to 30 microns, greater than or equal to 40 microns, greater than or equal to 50 microns, greater than or equal to 60 microns, or greater than or equal to 70 microns. In some embodiments, the pasting paper has a mean pore size of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 30 microns, less than or equal to 20 microns, less than or equal to 10 microns, or less than or equal to 5 microns. Combinations of the above-referenced ranges are also possible (e.g., greater than or equal to 2 microns and less than or equal to 100 microns, greater than or equal to 2 microns and less than or equal to 50 microns, or greater than or equal to 2 microns and less than or equal to 10 microns). Other ranges are also possible. Mean pore size may be determined by using a Capillary Flow Porometer manufactured by Porous Materials, Inc. in accordance with the ASTM F316-03 standard.

The pasting paper may have a variety of suitable maximum pore sizes. For example, in some embodiments, the pasting paper has a maximum pore size of greater than or equal to 2 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 15 microns, greater than or equal to 20 microns, greater than or equal to 30 microns, greater than or equal to 40 microns, greater than or equal to 50 microns, greater than or equal to 75 microns, greater than or equal to 100 microns, greater than or equal to 150 microns, or greater than or equal to 200 microns. In some embodiments, the pasting paper has a maximum pore size of less than or equal to 300 microns, less than or equal to 290 microns, less than or equal to 280 microns, less than or equal to 270 microns, less than or equal to 260 microns, less than or equal to 250 microns, less than or equal to 225 microns, less than or equal to 200 microns, less than or equal to 175 microns, less than or equal to 150 microns, less than or equal to 125 microns, less than or equal to 100 microns, less than or equal to 75 microns, less than or equal to 50 microns, less than or equal to 40 microns, less than or equal to 30 microns, or less than or equal to 20 microns. Combinations of the above-referenced ranges are also possible (e.g., greater than or equal to 2 microns and less than or equal to 300 microns, greater than or equal to 5 microns and less than or equal to 50 microns, or greater than or equal to 7 microns and less than or equal to 20 microns). Other ranges are also possible. Maximum pore size may be determined by using a Capillary Flow Porometer manufactured by Porous Materials, Inc. in accordance with the ASTM F316-03 standard.

The pasting paper may have a variety of suitable BET specific surface areas. For example, in some embodiments, the pasting paper has a BET specific surface area of greater than or equal to 0.1 $m^2/g$, greater than or equal to 0.2 $m^2/g$, greater than or equal to 0.3 $m^2/g$, greater than or equal to 0.4 $m^2/g$, greater than or equal to 0.5 $m^2/g$, greater than or equal to 0.8 $m^2/g$, greater than or equal to 1 $m^2/g$, greater than or equal to 1.5 $m^2/g$, greater than or equal to 2 $m^2/g$, greater than or equal to 3 $m^2/g$, greater than or equal to 4 $m^2/g$, greater than or equal to 5 $m^2/g$, or greater than or equal to 8 $m^2/g$. In some embodiments, the pasting paper has a BET specific surface of less than or equal to 10 $m^2/g$, less than or equal to 9 $m^2/g$, less than or equal to 8 $m^2/g$, less than or equal to 7 $m^2/g$, less than or equal to 6 $m^2/g$, less than or equal to 5 $m^2/g$, less than or equal to 4 $m^2/g$, less than or equal to 3 $m^2/g$, less than or equal to 2 $m^2/g$, less than or equal to 1 $m^2/g$, less than or equal to 0.8 $m^2/g$, less than or equal to 0.5 $m^2/g$, less than or equal to 0.4 $m^2/g$, less than or equal to 0.3 $m^2/g$, or less than or equal to 0.2 $m^2/g$. Combinations of the above-referenced ranges are also possible (e.g., greater than or equal to 0.1 $m^2/g$ and less than or equal to 10 $m^2/g$, greater than or equal to 0.8 $m^2/g$ and less than or equal to 3 $m^2/g$, or greater than or equal to 1.5 $m^2/g$ and less than or equal to 2.5 $m^2/g$). Other ranges are also possible. The specific surface area may be determined in accordance with section 10 of Battery Council International Standard BCIS-03A (2002), "Recommended Battery Materials Specifications Valve Regulated Recombinant Batteries", section 10 being "Standard Test Method for Surface Area of Recombinant Battery Separator Mat". Following this technique, the specific surface area is measured via adsorption analysis using a BET surface analyzer (e.g., Micromeritics Gemini III 2375 Surface Area Analyzer) with nitrogen gas; the sample amount is between 0.5 and 0.6 grams in a 3/4" tube; and, the sample is allowed to degas at 75° C. for a minimum of 3 hours.

The pasting paper may have a variety of suitable air permeabilities. For example, in some embodiments, the pasting paper has an air permeability of greater than or equal to 2 CFM, greater than or equal to 5 CFM, greater than or equal to 10 CFM, greater than or equal to 15 CFM, greater than or equal to 20 CFM, greater than or equal to 30 CFM, greater than or equal to 40 CFM, greater than or equal to 50 CFM, greater than or equal to 80 CFM, greater than or equal to 100 CFM, greater than or equal to 150 CFM, greater than or equal to 200 CFM, greater than or equal to 250 CFM, greater than or equal to 300 CFM, greater than or equal to 400 CFM, greater than or equal to 500 CFM, greater than or equal to 750 CFM, or greater than or equal to 1000 CFM. In some embodiments, the pasting paper has an air permeability of less than or equal to 1300 CFM, less than or equal to 1200 CFM, less than or equal to 1100 CFM, less than or equal to 1000 CFM, less than or equal to 900 CFM, less than or equal to 800 CFM, less than or equal to 700 CFM, less than or equal to 600 CFM, less than or equal to 500 CFM, less than or equal to 400 CFM, less than or equal to 300 CFM, less than or equal to 250 CFM, less than or equal to 200 CFM, less than or equal to 150 CFM, less than or equal to 100 CFM, less than or equal to 75 CFM, less than or equal to 50 CFM, or less than or equal to 40 CFM. Combinations of the above-referenced ranges are also possible (e.g., greater than or equal to 2 CFM and less than or equal to 1300 CFM, greater than or equal to 2 CFM and less than or equal to 500 CFM, greater than or equal to 20 CFM and less than or equal to 150 CFM, or greater than or equal to 30 CFM and less than or equal to 100 CFM). Other ranges are also possible. As used herein, CFM refers to cubic feet per square foot of sample area per minute ($ft^3/ft^2$ min). The air permeability may be determined in accordance with ASTM Test Standard D737-96 under a pressure drop of 125 Pa on a sample with a test area of 38 $cm^2$.

The pasting paper may have a variety of suitable dry tensile strengths in the machine direction. For example, in some embodiments, the pasting paper has a dry tensile strength in the machine direction that is greater than or equal to 0.2 lbs/in, greater than or equal to 0.5 lbs/in, greater than or equal to 1 lbs/in, greater than or equal to 1.5 lbs/in, greater than or equal to 2 lbs/in, greater than or equal to 2.5 lbs/in, or greater than or equal to 3 lbs/in. In some embodiments, the pasting paper has a dry tensile strength in the machine direction of less than or equal to 5 lbs/in, less than or equal to 4.5 lbs/in, less than or equal to 4 lbs/in, less than or equal to 3.5 lbs/in, less than or equal to 3 lbs/in, less than or equal to 2.5 lbs/in, less than or equal to 2 lbs/in, less than or equal to 1.5 lbs/in, less than or equal to 1 lbs/in, or less than or equal to 0.5 lbs/in. Combinations of the above-referenced ranges are also possible (e.g., greater than or equal to 0.2 lbs/in and less than or equal to 5 lbs/in, greater than or equal to 0.2 lbs/in and less than or equal to 3 lbs/in, or greater than or equal to 0.2 lb/in and less than or equal to 1.5 lbs/in). Other ranges are also possible. The dry tensile strength of the pasting paper may be determined in accordance with BCIS-03A, Rev. December 2015, Method 9.

The pasting paper may have a variety of suitable dry tensile strengths in the cross direction. For example, in some embodiments, the pasting paper has a dry tensile strength in the cross direction that is greater than or equal to 0.1 lbs/in, greater than or equal to 0.12 lbs/in, greater than or equal to 0.15 lbs/in, greater than or equal to 0.2 lbs/in, greater than or equal to 0.3 lbs/in, greater than or equal to 0.4 lbs/in, greater than or equal to 0.5 lbs/in, greater than or equal to 0.7 lbs/in, greater than or equal to 1 lbs/in, greater than or equal to 1.5 lbs/in, greater than or equal to 2 lbs/in, greater than or equal to 2.5 lbs/in, or greater than or equal to 3 lbs/in. In some embodiments, the pasting paper has a dry tensile strength in the cross direction of less than or equal to 5 lbs/in, less than or equal to 4.5 lbs/in, less than or equal to 4 lbs/in, less than or equal to 3.5 lbs/in, less than or equal to 3 lbs/in, less than or equal to 2.5 lbs/in, less than or equal to 2 lbs/in, less than or equal to 1.5 lbs/in, less than or equal to 1 lbs/in, less than or equal to 0.8 lbs/in, or less than or equal to 0.5 lbs/in. Combinations of the above-referenced ranges are also possible (e.g., greater than or equal to 0.1 lbs/in and less than or equal to 5 lbs/in, greater than or equal to 0.1 lbs/in and less than or equal to 1.5 lbs/in, or greater than or equal to 0.12 lbs/in and less than or equal to 0.8 lbs/in). Other ranges are also possible. The dry tensile strength of the pasting paper may be determined in accordance with BCIS-03A, Rev. December 2015, Method 9.

The pasting papers may have a variety of suitable electrical resistances. For example, in some embodiments, the pasting paper has an electrical resistance of greater than or equal to 5 milliΩ·cm$^2$, greater than or equal to 10 milliΩ·cm$^2$, greater than or equal to 15 milliΩ·cm$^2$, greater than or equal to 20 milliΩ·cm$^2$, greater than or equal to 25 milliΩ·cm$^2$, greater than or equal to 30 milliΩ·cm$^2$, greater than or equal to 40 milliΩ·cm$^2$, greater than or equal to 50 milliΩ·cm$^2$, or greater than or equal to 75 milliΩ·cm$^2$. In some embodiments, the pasting paper has an electrical resistance of less than or equal to 100 milliΩ·cm$^2$, less than or equal to 90 milliΩ·cm$^2$, less than or equal to 80 milliΩ·cm$^2$, less than or equal to 70 milliΩ·cm$^2$, less than or equal to 60 milliΩ·cm$^2$, less than or equal to 50 milliΩ·cm$^2$, less than or equal to 40 milliΩ·cm$^2$, less than or equal to 30 milliΩ·cm$^2$, or less than or equal to 20 milliΩ·cm$^2$. Combinations of the above-referenced ranges are also possible (e.g., greater than or equal to 5 milliΩ·cm$^2$ and less than or equal to 100 milliΩ·cm$^2$, greater than or equal to 5 milliΩ·cm$^2$ and less than or equal to 50 milliΩ·cm$^2$, or greater than or equal to 5 milliΩ·cm$^2$ and less than or equal to 30 milliΩ·cm$^2$). Other ranges are also possible. The electrical resistance may be determined in accordance by performing BCIS-03B (2002), method 18 and omitting the pretreatment or conditioning step.

Figure 4:
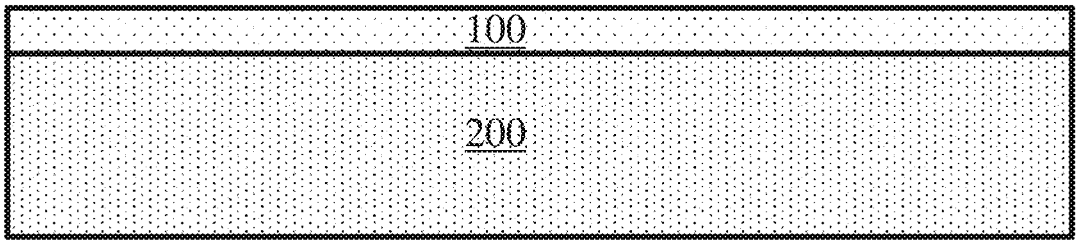
FIG. 4 shows a side-view schematic depiction of a pasting paper disposed on a battery plate, in accordance with some embodiments.

In some embodiments, a pasting paper disposed on a battery plate may aid handling of the battery plate. The pasting paper-covered battery plate may be easier to manipulate than an uncovered battery plate. FIG. 4 shows one non-limiting example of a pasting paper 100 disposed on a battery plate 200. In some embodiments, the battery plate may further comprise one or more additional components, such as a grid on which the battery paste is disposed (not shown). It should be noted that, although FIG. 4 shows the pasting paper and the battery plate as fully separate layers, in some embodiments the pasting paper may be partially and/or fully embedded in the battery plate. For instance, the pasting paper may be positioned such that at least a portion of the battery plate (e.g., the battery paste therein) penetrates into at least a portion of the pasting paper, and/or such that at least a portion of the pasting paper penetrates into at least a portion of the battery plate (e.g., into at least a portion of the battery paste therein). The surface of the pasting paper opposite the battery plate is typically free from any components present the battery plate (e.g., it is typically free from the battery paste in the battery plate). In other words, the surface of the pasting paper opposite the battery plate is typically not embedded in the battery plate.

As used herein, when a battery component is referred to as being "disposed on" another battery component, it can be directly disposed on the battery component, or an intervening battery component also may be present. A battery component that is "directly disposed on" another battery component means that no intervening battery component is present.

When disposed on a battery plate, a pasting paper may cover the battery plate during subsequent battery fabrication steps such as cutting the battery plate to size, drying and/or curing the battery plate in an oven, and assembling the battery plate with other battery components. The presence of the pasting paper on the battery plate during such steps may be advantageous. For instance, in some cases, the pasting paper may have a relatively low permeability to a battery paste. As an example, in the case of a pasting paper configured to be disposed on battery plates comprising lead particles, the pasting paper may have a relatively low permeability to lead particles. Relatively low amounts of wet lead and/or dry lead may be capable of passing through the pasting paper (e.g., the pasting paper may exhibit relatively low levels of wet lead bleeding through and/or dry lead dusting therethrough). As another example, in the case of a pasting paper configured to be disposed on battery plates comprising lead dioxide particles, the pasting paper may have a relatively low permeability to lead dioxide particles. Relatively low amounts of wet lead dioxide and/or dry lead dioxide may be capable of passing through the pasting paper (e.g., the pasting paper may exhibit relatively low levels of wet lead dioxide bleeding through and/or dry lead dioxide dusting therethrough). In such cases, the presence of a pasting paper disposed on the battery plate may also reduce exposure of individuals handling the battery plate to components of the battery plate (e.g., hazardous components, such as lead particles and/or lead dioxide particles in pasting papers configured for use in lead-acid batteries), and/or may reduce sticking between adjacent battery plates.

In some embodiments, a battery plate on which a pasting paper is disposed may be incorporated into a battery. For example, certain methods described herein may comprise positioning a battery plate (e.g., a battery plate on which a pasting paper is disposed) in a battery. The pasting paper may be positioned on a battery plate during battery plate processing, and then not removed from the battery plate prior to incorporation of the battery plate into a battery. As another example, certain methods may comprise assembling a battery, such as a lead-acid battery. The battery may be assembled by assembling a first battery plate on which a pasting paper is disposed with other battery components. These components may include one or more of a second battery plate, a separator, an electrolyte, and one or more current collectors.

Figure 5:
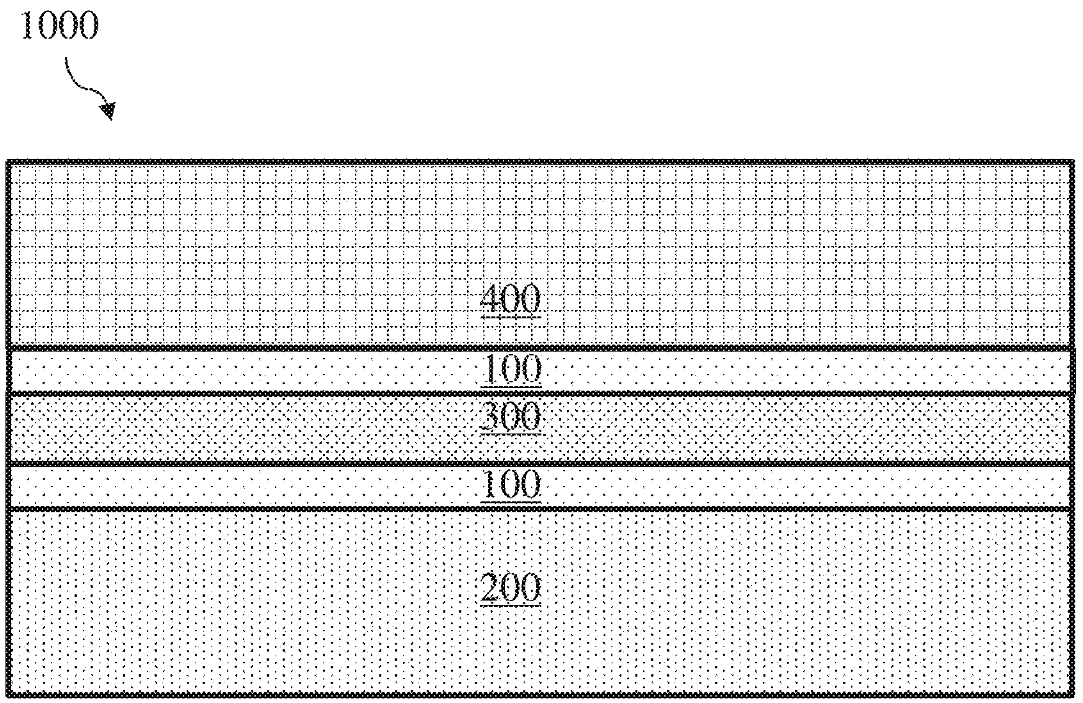
FIG. 5 shows a side-view schematic depiction of a battery, in accordance with some embodiments.

FIG. 5 shows one non-limiting example of a battery 1000 comprising a first battery plate 200, a pasting paper 100, a separator 300, another pasting paper 100 (which may be the same or different than the pasting paper on the first battery plate), and a second battery plate 400. It should be understood that pasting papers described herein may be incorporated into batteries comprising fewer components than those shown in FIG. 5 (e.g., batteries lacking a separator), and/or may be incorporated into batteries comprising more components than those shown in FIG. (e.g., batteries comprising one or more current collectors). Other configurations are also possible.

As described above, in some embodiments the pasting papers described herein may be suitable for lead-acid batteries. However, the pasting papers may also be used for other battery types and references to lead-acid batteries herein should be understood not to be limiting. Lead-acid batteries typically comprise a first battery plate (e.g., a negative battery plate) that comprises lead and a second battery plate (e.g., a positive battery plate) that comprises lead dioxide. During discharge, electrons pass from the first battery plate to the second battery plate while the lead paste in the first battery plate is oxidized to form lead sulfate and the lead dioxide in the second battery plate is reduced to also form lead sulfate. During charge, electrons pass from the second battery plate to the first battery plate while the lead sulfate in the first battery plate is reduced to form lead and the lead sulfate in the second battery plate is oxidized to form lead dioxide. Pasting papers as described herein may be suitable for use on positive battery plates and/or negative battery plates.

In some embodiments, a pasting paper as described herein may be disposed on a battery plate for use in a valve regulated lead-acid battery (VRLA) battery, such as an AGM/VRLA battery, (and/or may be present in a VRLA battery such as an AGM/VRLA battery), or may be disposed on a battery plate for use in a VRLA/Gel battery (and/or may be present in a VRLA/Gel battery). VRLA batteries are lead-acid batteries that comprise a valve configured to vent one or more gases from the battery. These gases may include gases that form as a result of electrolyte decomposition during overcharging, such as hydrogen gas and/or oxygen gas. It may be desirable to maintain the gases in the battery so that they may recombine, reducing or eliminating the need to replenish the decomposed electrolyte. However, it may also be desirable to maintain the pressure inside the battery at a safe level. For these reasons, the valve may be configured to vent the gas(es) under some circumstances, such as when the pressure inside the battery is above a threshold value, but not in others, such as when the pressure inside the battery is below the threshold value.

It should be noted that pasting papers described herein may, in some embodiments, be disposed on battery plates configured to be used with (and/or battery plates positioned in) other types of lead-acid batteries. For instance, a pasting paper may be disposed on a battery plate for use in a conventional flooded battery (and/or may be present in a conventional flooded battery), and/or may be disposed on a battery plate for use in an enhanced flooded battery (an EFB) (and/or may be present in an EFB battery).

Battery plates described herein (e.g., battery plates on which pasting papers are disposed, first battery plates, negative battery plates, second battery plates, positive battery plates) typically comprise a battery paste disposed on a grid. A battery paste included in a first battery plate (e.g., a negative battery plate) may comprise lead, and/or may comprise both lead and lead dioxide (e.g., prior to full charging, during fabrication, battery assembly, and/or during one or more portions of a method described herein). A battery paste included in a second battery plate (e.g., a positive battery plate), may comprise lead dioxide, and/or may comprise both lead and lead dioxide (e.g., prior to full charging, during fabrication, battery assembly, and/or during one or more portions of a method described herein). Grids (e.g., a grid included in a first battery plate, a grid included in a negative battery plate, a grid included in a second battery plate, a grid included in a positive battery plate), in some embodiments, include lead and/or a lead alloy.

In some embodiments, one or more battery plates (e.g., battery plates on which pasting papers are disposed, first battery plates, negative battery plates, second battery plates, positive battery plates) may further comprise one or more additional components. For instance, a battery plate may comprise a reinforcing material, such as an expander. When present, an expander may comprise barium sulfate, carbon black and lignin sulfonate as the primary components. The components of the expander(s) (e.g., carbon black and/or lignin sulfonate, if present, and/or any other components) can be pre-mixed or not pre-mixed. In some embodiments, a battery plate may comprise a commercially available expander, such as an expander produced by Hammond Lead Products (Hammond, IN) (e.g., a Texex® expander) or an expander produced by Atomized Products Group, Inc. (Garland, TX). Further examples of reinforcing materials include chopped organic fibers (e.g., having an average length of 0.125 inch or more), chopped glass fibers, metal sulfate(s) (e.g., nickel sulfate, copper sulfate), red lead (e.g., a Pb304-containing material), litharge, and paraffin oil.

It should be understood that while the additional components described above may be present in any combination of battery plates in a battery (e.g., in a first or negative battery plate and a second or positive battery plate, in a first or negative battery plate but not a second or positive battery plate, in a second or positive battery plate but not a first or negative battery plate, in no battery plates), certain additional components may be especially advantageous for some types of battery plates. For instance, expanders, metal sulfates, and paraffins may be especially advantageous for use in second or positive battery plates. One or more of these components may be present in a second or positive battery plate, and absent in a first or negative battery plate. Some additional components described above may have utility in many types of battery plates (e.g., first battery plates, negative battery plates, second battery plates, positive battery plates). Non-limiting examples of such components include fibers (e.g., chopped organic fibers, chopped glass fibers). These components may, in some embodiments, be present in both first and second battery plates, and/or be present in both negative and positive battery plates.

In some embodiments, a battery comprising a battery plate on which a pasting paper (e.g., any combinations of embodiments disclosed herein for pasting paper) is disposed may further comprise a separator (e.g., any combination of embodiments disclosed herein for separators). The separator may be positioned between a negative battery plate and a positive battery plate therein to prevent electronic short circuiting. Non-limiting examples of suitable separators include non-woven glass separators (e.g., absorptive glass mat (AGM) separators), poly(ethylene) separators, separators comprising a phenol resin, leaf separators, envelope separators (i.e., separators sealed on three sides), z-fold separators, sleeve separators, corrugated separators, C-wrap separators, U-wrap separators, etc. The separator, if present, may be infiltrated by an electrolyte, such as sulfuric acid (e.g., at 1.28 spg), which promotes ion transport between the two battery plates during discharge and charge.

Fiber webs and pasting papers described herein may be produced using suitable processes, such as a wet laid process. In general, a wet laid process involves mixing together fibers of one or more type; for example, a plurality of glass fibers may be mixed together with a plurality of multicomponent fibers and a plurality of cellulose fibers to provide a fiber slurry. The slurry may be, for example, an aqueous-based slurry. In certain embodiments, fibers are optionally stored separately, or in combination, in various holding tanks prior to being mixed together.

For instance, each plurality of fibers or fiber type may be mixed and pulped together in separate containers. As an example, a plurality of glass fibers may be mixed and pulped together in one container, a plurality of multicomponent fibers may be mixed and pulped in a second container, and a plurality of cellulose fibers may be mixed and pulped in a third container. The pluralities of fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components may also be introduced into the mixture. Furthermore, it should be appreciated that other combinations of fiber types may be used in fiber mixtures, such as the various fiber types described herein.

In certain embodiments, a fiber web may be formed by a wet-laid process. For example, in some embodiments, a single dispersion (e.g., a pulp) in a solvent (e.g., an aqueous solvent such as water) or slurry can be applied onto a wire conveyor in a papermaking machine (e.g., a fourdrinier or a rotoformer) to form a single layer supported by the wire conveyor. Vacuum may be continuously applied to the dispersion of fibers during the above process to remove the solvent from the fibers, thereby resulting in an article containing the single layer.

In some embodiments, multiple layers may be formed simultaneously or sequentially in a wet-laid process. For instance, a first layer may be formed as described above, and then one or more layers may be formed on the first layer by following the same procedure. As an example, a dispersion in a solvent or slurry may be applied to a first layer on a wire conveyor, and vacuum applied to the dispersion or slurry to form a second layer on the first layer. Further layers may be formed on the first layer and the second layer by following this same process.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet-laid process uses similar equipment as in a conventional papermaking process, for example, a hydropulper, a former or a headbox, a dryer, and an optional converter. A fiber web or pasting paper can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% and 0.5% by weight.

In some cases, the pH of the fiber slurry may be adjusted as desired. For instance, fibers of the slurry may be dispersed under acidic or neutral conditions.

Before the slurry is sent to a headbox, the slurry may optionally be passed through centrifugal cleaners and/or pressure screens for removing undesired material (e.g., unfiberized material). The slurry may or may not be passed through additional equipment such as refiners or deflakers to further enhance the dispersion of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, or an inclined wire fourdrinier.

After formation of a pasting paper, it may be incorporated into a battery plate. For instance, the pasting paper may be disposed on a battery plate. Battery plates for lead-acid batteries are typically formed by positioning a battery paste comprising lead and/or lead dioxide on a metal grid. After a battery plate is formed, the pasting paper may then be positioned on (and, optionally, at least partially embedded in) the battery paste therein. Then, the pasting paper covered battery plate may undergo further manufacturing steps, such as being cut to form plates appropriately sized for inclusion in a battery, and/or being cured in an oven.

Once ready for inclusion in a final battery, the pasting paper covered battery plate may be assembled with other battery components, such as an additional battery plate (e.g., a negative battery plate may be assembled with a positive battery plate), a separator, etc. These components may be placed in an external casing, and, optionally, compressed. If compressed, the thickness of one or more battery components (e.g., a pasting paper disposed on a battery plate) may be reduced. Then, an electrolyte, such as 1.28 spg sulfuric acid, may be added to the battery.

After assembly, the battery may undergo a formation step, during which the battery becomes fully charged and ready for operation. Formation may involve passing an electric current through an assembly of alternating negative and positive battery plates separated by separators. During formation, the battery paste in the negative and positive battery plates may be converted into negative and positive active materials, respectively. For example, lead dioxide in a battery paste disposed on the negative battery plate may be transformed into lead dioxide, and/or lead in a battery paste disposed on the positive battery plate may be transformed into lead dioxide.

When present, a plurality of cellulose fibers in a pasting paper may dissolve in an electrolyte over any suitable period of time after the addition of the electrolyte to the battery. For instance, at least a portion of the plurality of cellulose fibers, or all of the plurality of cellulose fibers, may be dissolved in the electrolyte prior to formation. In some embodiments, at least a portion of a plurality of cellulose fibers, or all of the plurality of cellulose fibers, dissolve in the electrolyte during formation. In some embodiments, at least a portion of the plurality of cellulose fibers, or all of the plurality of cellulose fibers, may be dissolved in the electrolyte after formation.

EXAMPLE 1

In this example, the aspect ratio, average fiber diameter, and average fiber length of numerous commercial glass fibers were measured and compared to glass fibers disclosed herein (i.e., fibers A and B).

The measured average fiber diameters, average fiber lengths, and average aspect ratios for the commercial glass fibers compared to glass fibers disclosed herein (i.e., fibers A and B) are shown in Table 1. Average fiber diameters were calculated from BET SSA (as disclosed herein), and average fiber lengths and average aspect ratios were measured by Diamscope (as disclosed elsewhere herein).

TABLE 1

Properties of Glass Fiber

| Label | Average fiber diameter | Average fiber length | Average aspect ratio |
|---|---|---|---|
| A | 1.505 | 0.107 | 71 |
| B | 1.434 | 0.090 | 63 |
| C | 0.947 | 0.117 | 124 |
| D | 4.077 | 0.183 | 45 |
| E | 0.987 | 0.123 | 124 |
| F | 2.812 | 0.185 | 66 |
| G | 1.022 | 0.133 | 130 |
| H | 1.887 | 0.126 | 67 |
| I | 1.419 | 0.125 | 88 |
| J | 1.380 | 0.144 | 104 |
| K | 1.498 | 0.114 | 76 |
| L | 2.364 | 0.182 | 77 |
| M | 1.546 | 0.143 | 93 |
| N | 0.819 | 0.091 | 114 |
| O | 0.812 | 0.110 | 136 |
| P | 0.877 | 0.121 | 138 |
| Q | 0.947 | 0.111 | 118 |
| R | 1.153 | 0.138 | 120 |
| S | 1.439 | 0.147 | 103 |
| T | 1.208 | 0.133 | 110 |
| U | 1.982 | 0.124 | 62 |
| V | 2.530 | 0.156 | 62 |
| W | 2.614 | 0.159 | 62 |
| X | 3.128 | 0.170 | 55 |

TABLE 1-continued

| Properties of Glass Fiber | | | |
|---|---|---|---|
| Label | Average fiber diameter | Average fiber length | Average aspect ratio |
| Y | 0.936 | 0.086 | 95 |
| Z | 0.927 | 0.130 | 140 |
| AA | 0.980 | 0.134 | 137 |
| BB | 1.427 | 0.112 | 78 |
| CC | 1.380 | 0.160 | 116 |
| DD | 1.660 | 0.143 | 86 |
| EE | 2.091 | 0.150 | 72 |
| FF | 1.363 | 0.150 | 110 |
| GG | 2.743 | 0.128 | 47 |
| HH | 1.102 | 0.119 | 110 |
| II | 0.907 | 0.113 | 125 |
| JJ | 0.837 | 0.110 | 132 |

Figure 6:
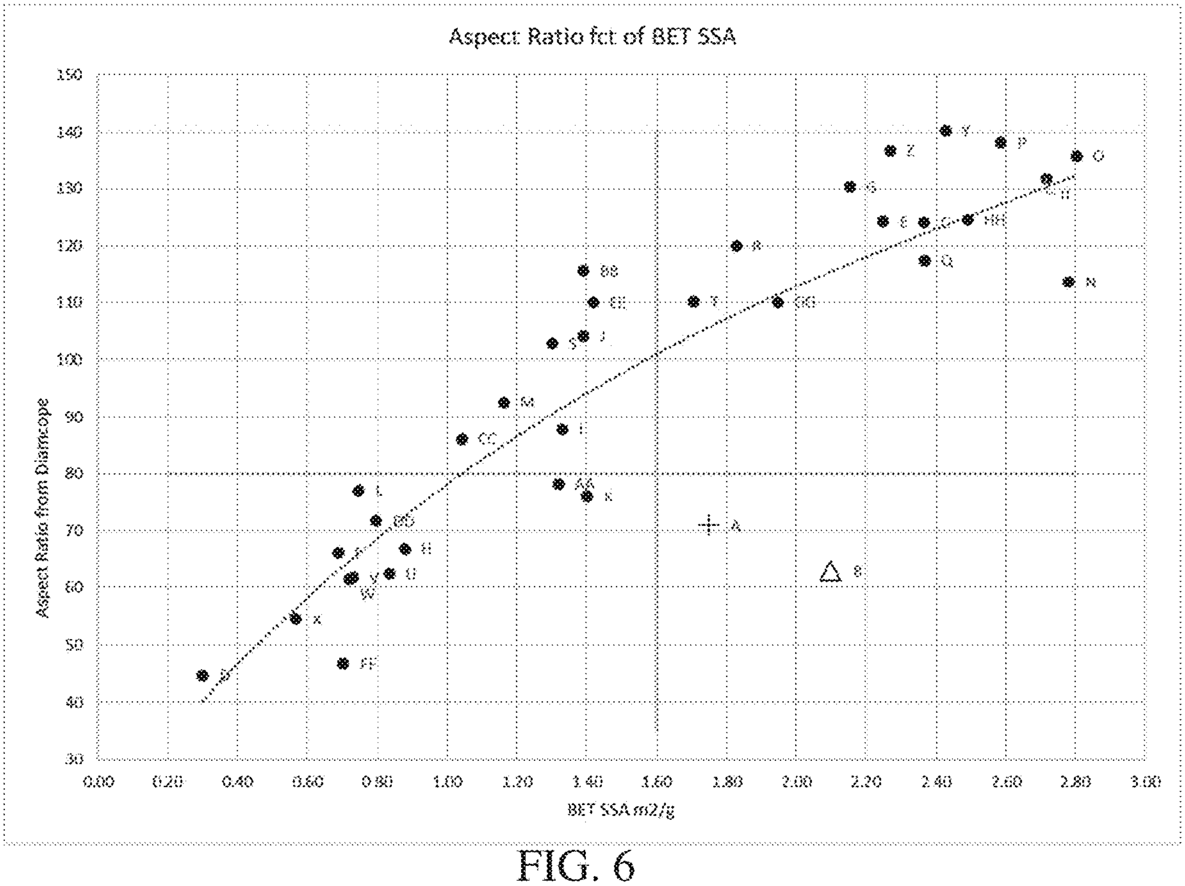
FIG. 6 plots aspect ratio versus BET specific surface area for numerous commercial glass fibers compared to glass fibers in accordance with some embodiments.

The BET specific surface area of the commercial glass fibers and glass fibers disclosed herein (i.e., fibers A and B) was also measured, as disclosed elsewhere herein, and the measured aspect ratios were plotted against the measured BET specific surface areas in FIG. 6. As shown in FIG. 6, for the commercial glass fibers, the BET specific surface area increased as the aspect ratio increased. However, fibers A and B maintained relatively low aspect ratios while having relatively high BET specific surface areas.

EXAMPLE 2

In this example, properties of various AGM separators made on paper machines were compared. Each AGM separator comprised a fiber web comprising different combinations of fine and coarse glass fibers. The properties of the AGM separators are shown below in Table 2.

TABLE 2

| Properties of AGM Separators | | | | | |
|---|---|---|---|---|---|
| | AGM1 | AGM2 | AGM3 | AGM4 | AGM5 |
| % Chopped Strand Glass Fiber | 10% | 10% | 5% | 5% | 8% |
| % Strengthening Fiber | 0% | 8% | 0% | 8% | 6% |
| % Fine fiber | 0% | 12% | 57% | 66% | 86% |
| Aspect Ratio Fine fiber | N/A | 130 | 130 | 130 | 63 |
| BET SSA Fine fiber ($m^2/g$) | N/A | 2.3 | 2.3 | 2.3 | 2.1 |
| % Coarse fiber | 90% | 70% | 38% | 21% | 0% |
| Aspect Ratio Coarse fiber | 76 | 70 | 76 | 76 | N/A |
| BET SSA ($m^2/g$) | 1.40 | 1.41 | 1.90 | 1.73 | 1.82 |
| Basis Weight ($g/m^2$) | 280 | 280 | 280 | 280 | 280 |
| Thickness @ 10 kPa (mm) | 1.74 | 1.85 | 1.75 | 1.85 | 1.70 |
| Thickness @ 20 kPa (mm) | 1.64 | 1.71 | 1.66 | 1.73 | 1.65 |
| Density @ 10 kPa ($g/m^2/mm$) | 161 | 151 | 160 | 152 | 165 |
| Density @ 20 kPa ($g/m^2/mm$) | 171 | 164 | 169 | 162 | 170 |
| Porosity @10 kPa (%) | 93.5 | 93.7 | 93.6 | 93.7 | 93.2 |
| Porosity @20 kPa (%) | 93.1 | 93.2 | 93.5 | 93.3 | 93.1 |
| MD Dry Tensile (kN/m) | 0.6 | 1.0 | 0.9 | 1.5 | 1.2 |
| MD Elongation (%) | 2.7 | 2.1 | 2.3 | 2.6 | 6.8 |
| CD Dry Tensile (kN/m) | 0.3 | 0.5 | 0.6 | 0.7 | 0.9 |
| CD Elongation (%) | 5.5 | 1.9 | 5.4 | 2.8 | 8.5 |
| Wet Tensile Strength MD (kN/m)* | 0.1 | 0.7 | 0.2 | 1.2 | 0.8 |
| Loss of Ignition (%) | 0.6 | 8.5 | 0.7 | 8.6 | 6.8 |
| Wicking height MD, acid (mm @ 2 min) | 67.4 | 60.4 | 55.9 | 56.0 | 49.0 |
| Wicking height MD, acid (mm@ 5 min) | 102.2 | 93.4 | 85.3 | 85.6 | 77.0 |
| Moisture content (%) | 0.3 | 0.4 | 0.3 | 0.6 | 0.7 |
| Max Pore Size (μm) | 13.6 | 14.9 | 9.1 | 11.5 | 8.1 |
| Mean Pore Size (μm) | 3.80 | 3.98 | 2.49 | 3.42 | 2.41 |
| Min Pore Size (μm) | 0.40 | 0.37 | 1.12 | 0.95 | 1.74 |
| Electrical Resistance (mohms · $cm^2$) | 62 | 89 | 75 | 101 | 82 |

The properties in Table 2 were determined as described elsewhere herein. If no method of measurement is described elsewhere herein for a given property, then that property was measured according to BCIS-03A (2015).

AGM5 had the best overall performance of all of the AGM separators tested, as it had the best combination of properties:

High tensile strength both dry and wet

High elongation at break

Relatively low electrical resistance

High surface area excellent against acid stratification

Small maximum pore size and mean pore size

Notably, only AGM5 comprised fine glass fibers having an average aspect ratio of less than or equal to 80 and an average BET specific surface area of greater than or equal to 1.6 $m^2/g$. Without wishing to be bound by theory, it is believed that AGM5 had lower $CO_2$ emissions and better overall performance than the other separators due to the combination of strengthening fibers with fine glass fibers having an average aspect ratio of less than or equal to 80 and an average BET specific surface area of greater than or equal to 1.6 $m^2/g$.

EXAMPLE 3

In this example, properties of various AGM separators made as laboratory handsheets were compared. Each AGM separator comprised a fiber web comprising different types of glass fibers or mixes thereof.

The AGM separators were made as follows:

1. The furnish (all glass and synthetic fibers needed) was weighed out for the Handsheet.
2. 2.5 liters of tap water were added in the disintegrator bucket.
3. 1.280 sg±0.005 of sulfuric acid ($H_2SO_4$) was added and stirred to achieve a 2.75±0.05 pH of the solution.

4. The weighed fibers were poured into the acidic solution in the disintegrator and blended for 2 minutes at 6000 rpm.
5. The base of the Handsheet mold was filled with tap water and it was confirmed that there were no air bubbles trapped under the wire screen of the base.
6. The plastic screen was placed gently on top of the wire screen to avoid air bubbles. The Handsheet mold was closed and filled to the desired level. The water pH was adjusted to 2.75±0.05 with 1.280 sg±0.005 sulfuric acid ($H_2SO_4$).
7. The blended pulp was transferred into the mold and the disintegrator bucket was rinsed into the mold.
8. A plastic rake was used to mix the pulped fibers in the mold to enhance even distribution.
9. The drain valve of the mold was opened to drain the liquid, leaving the sheet formed on the plastic screen.
10. The mold was opened and the plastic screen was gently picked up. A vac slot was used to remove water from the Handsheet.
11. The formed wet Handsheet on the plastic screen was gently removed and placed on the photo dryer for about 2 hours unless it was fully dry. The temperature of the photo dryer was about 120° C. The sheet was flipped with time on the photo dryer.

The properties of the AGM separators are shown below in Table 3.

TABLE 3

Mix % of all AGM mixes and corresponding aspect ratio and BET SSA Thereof

| | Types of Fibers | | | | | | | | | Separator Properties | | | |
|---|---|---|---|---|---|---|---|---|---|---|---|---|---|
| | Wt % Fine A | Wt % Coarse A | Wt % Fine B | Wt % Coarse B | Wt % Fine C | Wt % Coarse C | Wt % Coarse D | Wt % Fine E | Wt Fine F | BET SSA $m^2/g$ | Aspect ratio | PMI mean pore size (μm) | Tensile Strength (kN/m) |
| BET | 2.27 | 0.8 | 2.25 | 0.69 | 2.3 | 0.75 | 1.42 | 1.75 | 2.22 | | | | |
| Aspect Ratio | 137 | 72 | 124 | 66 | 130 | 77 | 76 | 74 | 61 | | | | |
| Average Diameter | 0.98 | 2.09 | 0.95 | 2.81 | 1.02 | 2.36 | 1.55 | 1.5 | 1.45 | | | | |
| A1 | 0 | 100 | | | | | | | | 0.78 | 65 | 14.8 | 1.8 |
| A2 | 25 | 75 | | | | | | | | 1.11 | 83 | 8.1 | 4.8 |
| A3 | 50 | 50 | | | | | | | | 1.48 | 94 | 4.4 | 10.0 |
| A4 | 75 | 25 | | | | | | | | 1.94 | 110 | 3.5 | 10.8 |
| A5 | 100 | 0 | | | | | | | | 2.28 | 126 | 3.0 | 11.0 |
| B1 | | | 0 | 100 | | | | | | 0.69 | 65 | 18.2 | 1.6 |
| B2 | | | 25 | 75 | | | | | | 0.96 | 80 | 9.1 | 6.1 |
| B3 | | | 50 | 50 | | | | | | 1.36 | 89 | 4.9 | 7.6 |
| B4 | | | 75 | 25 | | | | | | 1.74 | 99 | 3.7 | 8.4 |
| B5 | | | 100 | 0 | | | | | | 2.26 | 110 | 3.5 | 8.1 |
| C1 | | | | | 0 | 100 | | | | 0.75 | 67 | 16.1 | 3.1 |
| C2 | | | | | 25 | 75 | | | | 1.25 | 86 | 6.7 | 8.1 |
| C3 | | | | | 50 | 50 | | | | 1.60 | 97 | 4.7 | 8.6 |
| C4 | | | | | 75 | 25 | | | | 2.05 | 111 | 3.5 | 8.5 |
| C5 | | | | | 100 | 0 | | | | 2.39 | 120 | 3.0 | 8.6 |
| D1 | | | | | | | 100 | | | 1.42 | 76 | 5.31 | 4.3 |
| D2 | | | | | | | | 100 | | 1.75 | 74 | 4.35 | 3.5 |
| D3 | | | | | | | | | 100 | 2.22 | 61 | 3.54 | 2.5 |
| D4 | | | | | | | | | 94* | 2.09 | 74 | 6.55 | 8.1 |

*D4 had 94 wt % Fine Fibers F and 6 wt. % strengthening fibers.

Figure 7:
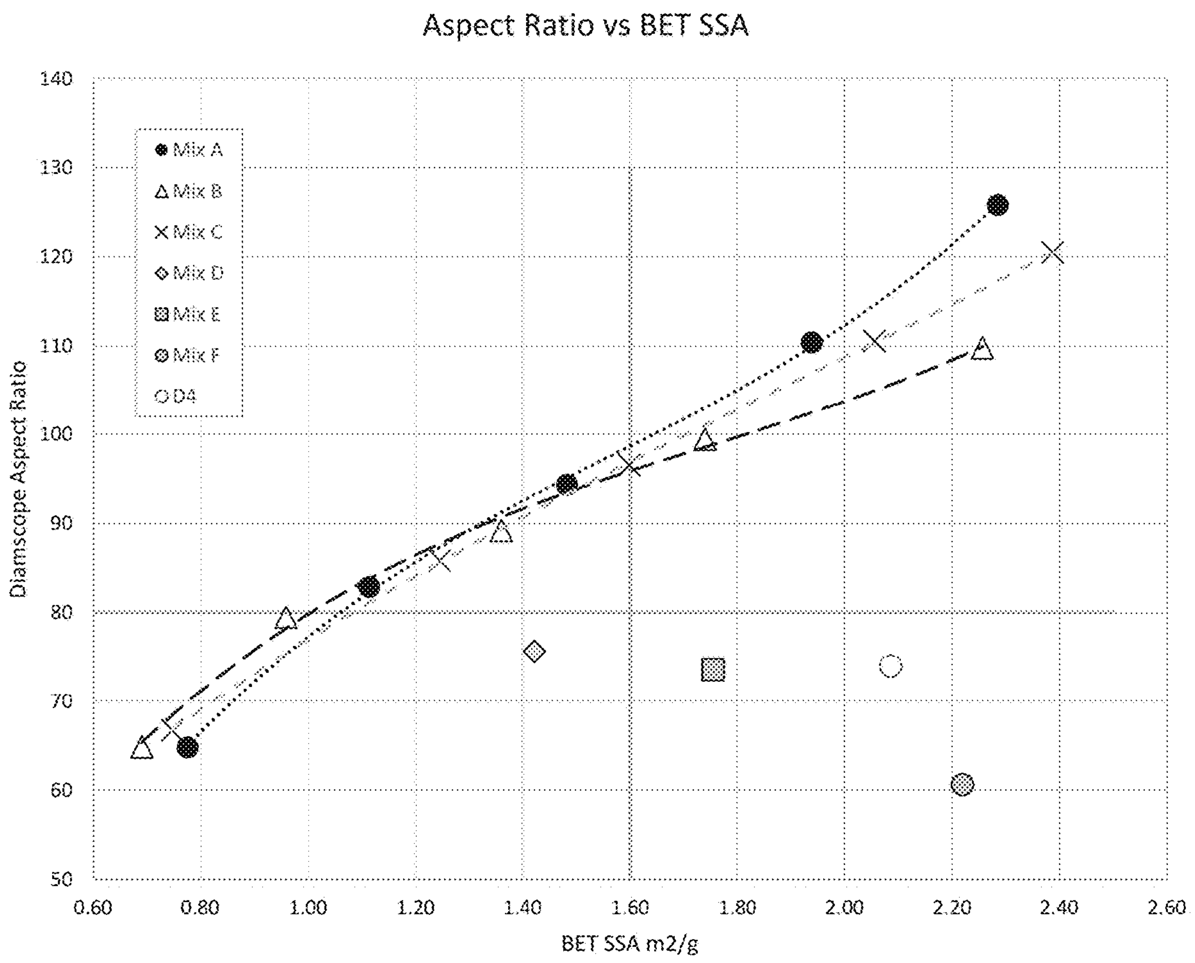
FIG. 7 plots aspect ratio versus BET specific surface area for AGM separators comprising various mixes of fibers.
Figure 9:
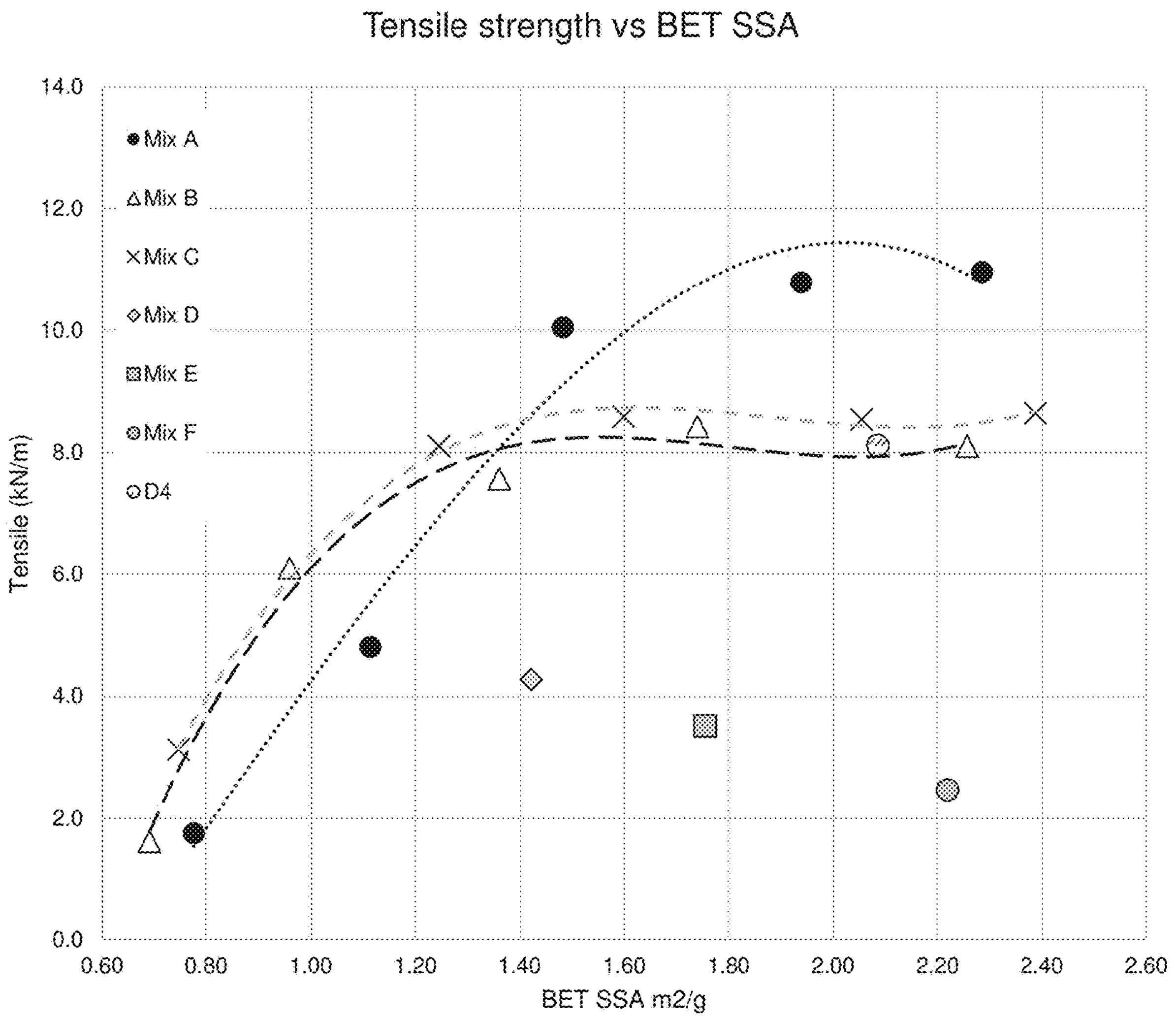
FIG. 9 plots tensile strength versus BET specific surface area for AGM separators comprising various mixes of fibers.

FIG. 7 plots the aspect ratio versus the BET SSA ($m^2/g$) for the AGM separators discussed in Table 3. "Mix A" in FIG. 7 and FIG. 9 (discussed below) refers to A1-A5 (each individually plotted) in Table 3. "Mix B" in FIG. 7 and FIG. 9 refers to B1-B5 (each individually plotted) in Table 3, "Mix C" in FIG. 7 and FIG. 9 refers to C1-C5 (each individually plotted) in Table 3, "Mix D" in FIG. 7 and FIG. 9 refers to D1 in Table 3, "Mix E" in FIG. 7 and FIG. 9 refers to D2 in Table 3, "Mix F" in FIG. 7 and FIG. 9 refers to D3 in Table 3, and "D4" in FIG. 7 and FIG. 9 refers to D4 in Table 3.

This example illustrates some possible fibers or mixes thereof to generate a wide range of AGM separators with a wide range of BET SSA. Some of the AGM separators (i.e., A1-C5) were made using commercially available microglass fibers (i.e., Coarse A, Coarse B, Coarse C, Coarse D, Fine A, Fine B, and Fine C). None of these fibers had an aspect ratio of less than or equal to 80 and an average BET specific surface area of greater than or equal to 1.6 $m^2/g$. However, Fine fibers E and F (used in AGM separators D2-D4) had an aspect ratio of less than or equal to 80 and an average BET specific surface area of greater than or equal to 1.6 $m^2/g$, in accordance with some embodiments described herein.

Figure 8:
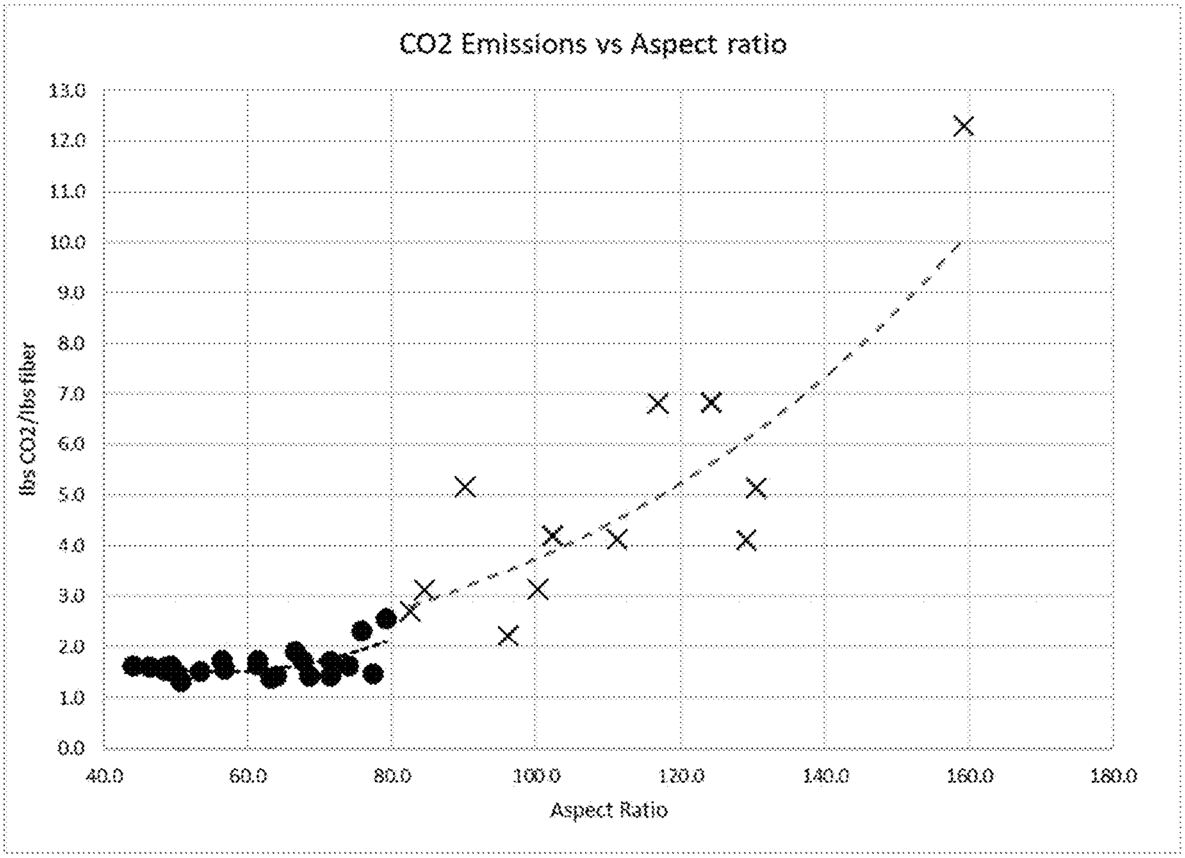
FIG. 8 plots the $CO_2$ emission coming from gas usage to make fibers versus the aspect ratio of the fiber.

As shown in Table 3, D2 and D3 had the combination of relatively high surface area and relatively low mean pore size like A3-A5, B3-B5, and C3-C5, but with lower $CO_2$ admission due to use of fine glass fibers E and F—as shown in FIG. 8, $CO_2$ emission typically increases as aspect ratio increases. However, D2 and D3 had relatively low tensile strength. It was unexpectedly discovered that the relatively low tensile strength could be increased by adding strengthening fibers (see D4). As shown in Table 3 and FIG. 9 (which plots tensile strength (kN/m) versus BET SSA ($m^2/g$)), D4 had the combination of relatively low mean pore size, relatively high surface area, relatively high tensile strength, and low $CO_2$ emissions. Accordingly, it was unexpectedly discovered that by combining strengthening fibers and fine glass fibers having an aspect ratio of less than or equal to 80 and an average BET specific surface area of greater than or equal to 1.6 $m^2/g$, low mean pore size, high surface area, high tensile strength, and low $CO_2$ emission were simultaneously achieved.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of." will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of." or "exactly one of." "Consisting essentially of." when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "wt %" is an abbreviation of weight percentage. As used herein, "at %" is an abbreviation of atomic percentage.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second." "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery separator, comprising:

a fiber web comprising fine glass fibers;

wherein the fine glass fibers have an average diameter of less than 1.6 microns, an average aspect ratio of less than or equal to 80, and an average BET specific surface area of greater than or equal to 1.6 $m^2/g$; and wherein the fiber web has a basis weight of greater than or equal to 20 $g/m^2$ and less than or equal to 600 $g/m^2$.

2. The battery separator of claim 1, wherein the fiber web further comprises coarse glass fibers, and wherein the coarse glass fibers have an average diameter of greater than or equal to 1.6 microns.

3. The battery separator of claim 2, wherein the coarse glass fibers comprise microglass fibers.

4. The battery separator of claim 2, wherein the fiber web comprises greater than 0 wt % and less than or equal to 80 wt % coarse glass fibers.

5. The battery separator of claim 1, wherein the fiber web further comprises strengthening fibers.

6. The battery separator of claim 5, wherein the strengthening fibers comprise synthetic fibers.

7. The battery separator of claim 6, wherein the strengthening fibers comprise bicomponent fibers.

8. The battery separator of claim 5, wherein the fiber web comprises greater than 0 wt % and less than or equal to 40 wt % strengthening fibers.

9. The battery separator of claim 5, wherein the strengthening fibers comprise chopped strand glass fibers.

10. The battery separator of claim 9, wherein the fiber web comprises greater than 0 wt % and less than or equal to 40 wt % of the chopped strand glass fibers.

11. The battery separator of claim 1, wherein the fine glass fibers comprise microglass fibers.

12. The battery separator of claim 1, wherein the fine glass fibers have an average aspect ratio of greater than or equal to 10.

13. The battery separator of claim 1, wherein the fine glass fibers have an average BET specific surface area of less than or equal to 5.0 $m^2/g$.

14. The battery separator of claim 1, wherein the fiber web comprises greater than or equal to 5 wt % and less than or equal to 100 wt % fine glass fibers.

15. The battery separator of claim 1, wherein the fine glass fibers have an average diameter of greater than or equal to 0.3 microns and less than 1.6 microns.

16. The battery separator of claim 1, wherein the fine glass fibers have an average length of greater than or equal to 0.01 mm and less than or equal to 0.3 mm.

17. The battery separator of claim 1, wherein the fiber web has a tensile strength in the machine direction of greater than or equal to 0.3 lbs/inch and less than or equal to 20 lbs/inch.

18. The battery separator of claim 1, wherein the fiber web has a BET specific surface area of greater than or equal to 0.5 $m^2/g$ and less than or equal to 4 $m^2/g$.

19. A pasting paper for use in a battery, comprising:

a fiber web comprising fine glass fibers;

wherein the fine glass fibers have an average diameter of less than 1.6 microns, an average aspect ratio of less than or equal to 80 and an average BET specific surface area of greater than or equal to 1.6 $m^2/g$; and wherein the pasting paper has a thickness of greater than or equal to 0.1 mm and less than or equal to 0.5 mm.

20. The pasting paper of claim 19, wherein the fiber web further comprises coarse glass fibers, and wherein the coarse glass fibers have an average diameter of greater than or equal to 1.6 microns.

21. The pasting paper of claim 19, wherein the fiber web further comprises strengthening fibers.

22. The pasting paper of claim 21, wherein the strengthening fibers comprise chopped strand glass fibers.

23. The pasting paper of claim 22, wherein the fiber web comprises greater than 0 wt % and less than or equal to 40 wt % of the chopped strand glass fibers.

24. The pasting paper of claim 22, wherein the chopped strand glass fibers have an average diameter of greater than or equal to 3 microns and less than or equal to 30 microns.

25. The pasting paper of claim 22, wherein the chopped strand glass fibers have an average length of greater than or equal to 2 mm and less than or equal to 50 mm.

26. The pasting paper of claim 19, wherein the pasting paper has a basis weight of greater than or equal to 5 $g/m^2$ and less than or equal to 100 $g/m^2$.

27. The pasting paper of claim 19, wherein the pasting paper has an electrical resistance of greater than or equal to 5 milliΩ·$cm^2$ and less than or equal to 100 milliΩ·$cm^2$.

28. The pasting paper of claim 19, wherein the pasting paper has an air permeability of greater than or equal to 2 CFM and less than or equal to 1300 CFM.

29. A plurality of glass fibers comprising fine glass fibers having an average diameter of less than 1.6 microns, an average aspect ratio of less than or equal to 80, and an average BET specific surface area of greater than or equal to 1.6 $m^2/g$.

30. The plurality of glass fibers of claim 29, wherein the fine glass fibers comprise microglass fibers.

31. The plurality of glass fibers of claim 29, wherein the fine glass fibers are produced by a flame blowing process and/or a rotary spinning process.

32. The plurality of glass fibers of claim 29, wherein the fine glass fibers have an average aspect ratio of greater than or equal to 10 and less than or equal to 80.

33. The plurality of glass fibers of claim 29, wherein the fine glass fibers have an average BET specific surface area of greater than or equal to 1.6 $m^2/g$ and less than or equal to 5.0 $m^2/g$.

34. The plurality of glass fibers of claim 29, wherein the fine glass fibers have an average diameter of greater than or equal to 0.3 microns and less than 1.6 microns.

35. The plurality of glass fibers of claim 29, wherein the fine glass fibers have an average length of greater than or equal to 0.01 mm and less than or equal to 0.3 mm.

* * * * *